(12) United States Patent
Holm et al.

(10) Patent No.: US 6,820,164 B2
(45) Date of Patent: Nov. 16, 2004

(54) PERIPHERAL COMPONENT INTERCONNECT BUS DETECTION IN LOGICALLY PARTITIONED COMPUTER SYSTEM INVOLVING AUTHORIZING GUEST OPERATING SYSTEM TO CONDUCT CONFIGURATION INPUT-OUTPUT OPERATION WITH FUNCTIONS OF PCI DEVICES

(75) Inventors: Wayne Gustav Holm, Rochester, MN (US); Robert Lowell Holtorf, Rochester, MN (US); Gregory Michael Nordstrom, Pine Island, MN (US); Allan Henry Trautman, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 09/836,692

(22) Filed: Apr. 17, 2001

(65) Prior Publication Data

US 2002/0152334 A1 Oct. 17, 2002

(51) Int. Cl.[7] ................................................ G06F 3/00
(52) U.S. Cl. ......................... 710/312; 710/314; 710/8; 710/2
(58) Field of Search ............................. 710/2, 8–11, 14, 710/15–18, 300–304, 105, 305, 306, 308, 314, 316, 317, 311–313; 711/114, 205, 207, 217

(56) References Cited

U.S. PATENT DOCUMENTS

| | | | | |
|---|---|---|---|---|
| 5,367,661 A | * | 11/1994 | Hough et al. ................. 703/27 |
| 5,414,851 A | * | 5/1995 | Brice, Jr. et al. ........... 709/104 |
| 5,555,414 A | * | 9/1996 | Hough et al. ................ 710/261 |
| 5,584,042 A | * | 12/1996 | Cormier et al. ................ 710/56 |
| 5,784,702 A | * | 7/1998 | Greenstein et al. ......... 711/173 |
| 6,023,736 A | * | 2/2000 | Lambeth et al. .............. 710/10 |
| 6,070,207 A | * | 5/2000 | Bell ........................... 710/302 |
| 6,085,277 A | | 7/2000 | Nordstrom et al. ......... 710/263 |
| 6,330,656 B1 | * | 12/2001 | Bealkowski et al. .......... 712/13 |
| 6,397,268 B1 | * | 5/2002 | Cepulis ......................... 710/8 |
| 6,519,645 B2 | * | 2/2003 | Markos et al. .............. 709/228 |
| 6,629,162 B1 | * | 9/2003 | Arndt et al. .................. 710/28 |
| 6,654,818 B1 | * | 11/2003 | Thurber ......................... 710/3 |
| 6,662,242 B2 | * | 12/2003 | Holm et al. ................... 710/9 |
| 6,665,759 B2 | * | 12/2003 | Dawkins et al. ............ 710/200 |
| 2002/0124127 A1 | * | 9/2002 | Dawkins et al. ............ 710/200 |

* cited by examiner

Primary Examiner—Paul R. Myers
Assistant Examiner—Raymond N Phan
(74) Attorney, Agent, or Firm—Moser, Patterson & Sheridah, LLP

(57) ABSTRACT

A method, which may be embodied upon a computer readable medium and executed by a processor, for detecting PCI buses in a logically partitioned system. The method may include determining PCI buses that are accessible to a guest operating system via querying a hypervisor, generating a PCI controller list, wherein a PCI controller exists for each determined PCI bus, and constructing a PCI bus structure for each PCI controller in the PCI controller list. The method may further include calling a platform dependent device detection code to detect PCI devices accessible to the logically partitioned system, and connecting to each function of each detected PCI device to authorize the guest operating system to conduct configuration IO operations thereon through a platform dependent code operation.

26 Claims, 20 Drawing Sheets

PERIPHERAL COMPONENT INTERCONNECT BUS DETECTION IN LOGICALLY PARTITIONED COMPUTER SYSTEM INVOLVING AUTHORIZING GUEST OPERATING SYSTEM TO CONDUCT CONFIGURATION INPUT-OUTPUT OPERATION WITH FUNCTIONS OF PCI DEVICES

BACKGROUND OF THE INVENTION

1. Field of the Invention

The present invention generally relates to a detection of PCI buses in partitioned computer systems.

2. Description of the Related Art

In logically partitioned computer systems, multiple distinct individual operating systems generally share a single computer hardware structure. Although the various operating systems share a single supporting hardware structure, the individual operating systems may run simultaneously and autonomously within their respective partitioned environments. In order to control and/or manage the multitude of operating systems in the various partitioned environments, a single global software system and/or firmware component, which may be termed a hypervisor, is generally utilized. The hypervisor is generally configured to manage and/or control the allocation/use of the resources available on the single computer hardware system by each of the respective operating systems. For example, the hypervisor may control resource access and allocation for the overall computer system data storage mediums, access to the available system CPUs, and/or any of the system input/output (IO) device adapters, along with other known features of computer systems. The hypervisor may be further configured to insure that the respective individual partitions are unaware of the existence of each other and do not interfere with their respective operations. In this type of logically partitioned system using a hypervisor, it is desirable to allow different partitions to share the respective IO buses, while maintaining exclusive ownership/control over the individual IO device adapters in communication with the IO buses.

A peripheral component interconnect (PCI) bus is an industry standard IO bus that is widely used in computer systems ranging from typical desktop systems running Microsoft Windows-type operating systems to open-source Linux based systems and large mainframe class computers, such as the IBM AS400/iSeries and RS6000/pSeries computers running OS400 and AIX, respectively. The PCI IO bus implemented in these types of systems is generally in communication with a computer system central processing unit (CPU) and/or memory complex via a PCI host bridge (PHB). Additionally, the PCI IO bus is generally in communication with a plurality of PCI-type devices. The specific types of IO devices may include IO device adapters that are configured to connect a given IO device type, i.e., a disk-type storage medium, a tape drive, or a network connection, for example, to the PCI bus. Further, a PCI bus may be in communication with additional PCI and/or other IO buses via a PCI bridge device in a structured tree-type hierarchy configuration, which may allow for substantial IO device density expansion. The additional PCI buses are generally positioned below the PHB and may be in communication with the root PCI bus. Therefore, in view of this configuration, the PHB may generally operate as an originating or root PCI bus of a tree of PCI devices and/or a combination of PCI and/or other IO buses. In smaller computer systems there may be only one or two PHBs connected to the memory bus, whereas larger more complex computer systems, such as those that are generally capable of logical partitioning-type functions, may have upwards of several hundred PHBs connected to the computer memory bus. The management of this quantity of PHBs and the accompanying IO devices in communication therewith presents substantial obstacles for the hypervisor.

In many PCI system implementations, such as personal computers (PCs), RS6000 configurations, and/or other workstation class computer systems, a firmware component of the system determines the configuration of the PCI buses and accompanying devices. The firmware may determine the configuration from the system boot programming and/or the initial program load (IPL) process and supporting code. In communications within the system after initialization, the firmware determined system configuration may be transmitted to the operating system and various software/hardware applications subsequently loaded by the firmware so that these applications can utilize the system's determined configuration in their respective initializations. Firmware may be a limited set of hardware configuration programs that reside in a read only-type memory and operate to initialize the computer hardware. The hardware initialization process is generally configured to facilitate the subsequent loading of the complete operating system software, which is generally stored on a readable/writable storage medium. Once the complete operating system is loaded, system control is generally transferred to the complete operating system from the firmware. For example, in a typical PC workstation or server configuration the firmware is referred to as the basic IO subsystem (BIOS) and is considered to be a component of the computer hardware that the computer manufacturer provides. Alternatively, operating system software may be provided by a third party, such as Microsoft Windows or DOS, IBM OS2, or Linux, for example.

In a logically partitioned computer system, a hypervisor program is generally an extension of the basic hardware control firmware of the computer. The hypervisor may operate to manage the partitioning of hardware resources between different operating systems that may be executing within the individual logical partitions. Therefore, in a logically partitioned system the hypervisor program may be thought of as the analog to the PC BIOS or firmware of non-partitioned-type computer systems. The hypervisor may also be configured to initialize only the hardware structure and/or elements that are assigned to particular partitions for those partitions. The computer hardware generally includes programs in a read only-type memory that encapsulates the details of the underlying computer hardware interconnections and control mechanisms. The combination of the hardware interconnections and control mechanisms enable the operating system to view the respective hardware elements as a collection of more abstract hardware elements that then appear similar for various underlying computer hardware implementations. The operating system also commonly includes PCI bus initialization programs that call these programs in the read only memory in order to activate specific hardware controls without direct knowledge of the specific underlying computer hardware interconnections and control mechanisms of the particular computer.

In a computer system using PCI buses, a device driver program executing within a logical partition generally controls the IO devices connected to the PCI bus. The PCI bus implementation generally includes the capability to generate a hardware interrupt signal from a PCI device in order to allow that device to alert the device driver program of a change in the state of the device. For example, an interrupt may be generated upon the completion of a command received from the device driver or at the occurrence of an event that is within the supervisory functions of the device driver. Generally accepted PCI standards specify interrupt signals that are output pins from a PCI device to its PCI bus connection. However, the accepted standards do not specify how these device interrupt outputs are connected to the other hardware elements of the computer system that effect the device driver program interrupt. For example, an interrupt controller that receives a PCI interrupt output signal from a device and causes a CPU interrupt may not be specified in current accepted standards. Generally, the computer hardware provides some form of interrupt controller that receives hardware interrupt outputs from other hardware components, including PCI devices, and generates a CPU interrupt indicating the particular hardware component that signaled the interrupt condition. The Intel Open Programmable Interrupt Controller is an example of an interrupt controller that is in wide use in PC, Workstation, and PC server class computers and that commonly provides 8 or 16 such interrupt inputs for receiving interrupts from PCI devices.

In smaller computer systems having only a few PCI devices implemented, a relatively small number of interrupt controller input connections is generally adequate to connect essentially every PCI device interrupt output to an unique interrupt controller input. In cases where the number of interrupt outputs from PCI devices exceeds the number of interrupt controller inputs, then multiple interrupt outputs may be connected to a single interrupt controller input. Therefore, in this configuration, when any one PCI device signals an interrupt, the device drivers for each of the devices connected to that interrupt controller input are generally interrupted in order to enable the controller to determine which device generated the interrupt signal.

Inasmuch as the particular hardware mechanisms generating program interrupts may differ from system to system, it is normally a function of the computer BIOS, firmware, and/or hypervisor to determine the specific association of an interrupt output signal from a PCI device with the respective CPU interrupt mechanism. It is also the function of the firmware, i.e., either the BIOS, firmware, or the hypervisor, to determine if more than one device interrupt output is connected to or shares a given interrupt controller input. Further, these firmware entities generally provide the ability to associate multiple device drivers with a shared interrupt controller input when the interrupt controller signals an interrupt condition on that particular interrupt input. Additionally, the firmware entities will generally insure that once an interrupt condition has been received and device drivers associated with that particular interrupt signal have been invoked, then any additional interrupt conditions for that same interrupt controller input are not signaled to the CPU until the first interrupt is cleared. As such, the CPU will not generally receive information about a subsequent interrupt on the same controller input until all device drivers have completed the processing of the current interrupt signal.

This type of interrupt sharing has become common in PCs, workstations, and PC servers as the number of PCI devices connected to a single computer system has grown beyond the capabilities of conventional interrupt controllers. Further, operating systems for these computers, particularly Microsoft Windows and Linux, have commonly implemented a software list or queue of device driver interrupt programs, generally termed an Interrupt Request Queue (IRQ). Each of the entries in the IRQ are generally associated with a given interrupt controller input. Therefore, the computer firmware may operate to provide a program call interface that the operating system may utilize to inhibit or enable interrupt signals to the CPU. This program call interface may be implemented within the firmware in a manner specific to the hardware interrupt blocking mechanisms of that particular computer system.

However, prior to any processing of interrupts or assignment of IRQs, the software or firmware must generally initialize. This initialization process generally includes a device detection process that is designed to determine specific parameters of each device in communication with the respective partitions and associate specific software programs and/or routines with the respective devices. Therefore, when an interrupt signal is generated by a particular device, the software has the information necessary to route the generated interrupt to the appropriate software program and/or routine.

In order to facilitate the software's detection and initialization of PCI buses and devices in a logically partitioned system, for example, each PCI device and/or PCI bridge generally provides a standardized configuration space. This configuration space may be composed of one or more register facilities, either internal or external, that are generally accessible to the software through PCI configuration read and write operations. The software may conduct configuration read and write operations using a mechanism in the PCI host bridge hardware that effects a PCI configuration read or write operation on that particular PCI bus and any subsequent PCI buses positioned lower in the tree structure. The PHB generally includes a process for the software to specify the intended configuration address, which generally consists of a bus number and device number, in addition to the configuration space register address. The PCI bus number of the configuration address is generally be specified in the PCI standard to be 8 bits and to identify a PCI bus within the PCI bus tree formed under a particular PHB. Therefore, the PCI bus number in a PCI configuration address generally operates to uniquely select one PCI bus in that PCI bus tree. Further, generally no more than 256 individual PCI buses may be connected within the scope of a particular PHB bus domain. The PCI device number may be formed by a 5-bit identification select parameter (ID select or IDSEL) that identifies and/or selects a device connection on a PCI bus and a 3-bit function number that identifies one of up to 8 independent PCI adapter functions in certain multifunction device (MFD) classes of PCI devices.

Therefore, in order to detect the presence of a particular device, the computer software may perform a PCI read operation to the PCI vendor ID register at a particular configuration address on the root bus. If a device exists at that specific address, the software may return data from the register specified in the read operation. If no device exists at the specified address, then the configuration read operation may terminate. Using this technique, in order to completely determine which configuration addresses are connected to PCI devices, the software may iteratively read the configuration vendor ID register at each possible configuration address on the root bus. This type of process is generally referred to as a "bus walk" type operation. Furthermore, in the situation where additional bridges are detected on a particular PCI bus, then the bus walk for the particular bridge may be repeated on the PCI bus created by that bridge for all possible configuration addresses on that subordinate PCI bus. Therefore, in sum, when an additional branch in the tree is discovered, the software iterates through each sub-branch of the newly discovered branch looking for devices.

The PCI configuration space of a device may further include registers that allow the system software to establish certain PCI bus operating parameters for that particular device. In particular, the PCI bus number of PCI buses created by PCI to PCI bridges, as well as that of the root bus created by the PHB, may be contained in configuration space registers that the system software may set with PCI configuration write operations. Therefore, the system software may determine the bus number of each PCI bus in a PCI bus tree, including that of the PHB root bus. The primary requirement is that the bus numbers of PCI buses at lower branches in the tree be numerically higher than that of the bus to which its PCI bridge is connected, but otherwise each PCI bus number, including that of the root bus, may be any value in the range 0 to 255 (although, 0 is useful only for the root bus created by a PHB, as any PCI buses created below that generally have a PCI bus number greater than that of the root bus).

Inasmuch as it simplifies the computer manufacturer firmware or BIOS and standardizes the manner in which an operating system detects PCI bus configuration on varying computer hardware designs, it is preferred within the industry that the system firmware or operating system software perform some form of PCI bus walk, and that this software "configure" the operating parameters of PCI devices on that bus. Using BIOS or firmware calls, an operating system can determine the presence and identity of individual PHBs and perform the PCI configuration read and write operations necessary to detect and configure these devices for operating system and device driver use. In some computer implementations, such as the IBM RS6000/pSeries, for example, the system firmware or BIOS performs PCI bus configuration and communicates the results to the operating system with a main storage data structure (commonly called a "device tree"). However, in many implementations, such as most versions of Linux, the operating system itself configures the PCI buses using configuration read and write operations directly to those devices.

In a logically partitioned system, generally only some of the PCI devices in the system are available to the operating system in a particular logical partition. However, it is desired to configure logical partitioning to allow the PCI devices assigned to individual partitions to be connected to the same PCI bus, so that only the devices themselves are owned exclusively by one particular partition but that any of the PCI buses connecting them are effectively shared by other logical partitions. To facilitate this sharing, the hypervisor may determine the configuration of all possible PCI buses and devices in the overall computer system and establish the operating parameters of those PCI buses that are shared by multiple partitions. Additionally, it may also be the function of the hypervisor to insure that the operating system and other programs in one logical partition do not perform PCI bus operations of any type to PCI devices that are not assigned to that partition. These functions generally require that the hypervisor set the PCI bus numbers of all PCI buses within the overall computer system in order to insure that the actions of an operating system in one logical partition are not visible or disruptive to the operations of another logical partition using PCI devices on the same PCI bus or buses.

Smaller computers using the PCI bus provide generally only one or two PHBs and a limited number of PCI device connections. In these types of systems, the number of PCI buses that may be created across all possible PCI bus trees is sufficiently small enough that the 8 bit PCI bus number for any one PCI bus may also uniquely identify that bus within the overall computer system and not just within the PCI bus tree formed under a particular PHB. Consequently, it is common practice for the operating systems of small computers, such as Linux, Microsoft Windows, arid 32-bit versions of AIX to uniquely number every PCI bus system wide using only the 8-bit PCI bus number applied in configuration read or write operations on particular PCI bus trees, even though that bus number needs to be unique only within that particular tree. Thus, operating systems designed for smaller computers generally do not themselves implement methods to uniquely identify more than 256 PCI buses within a system, nor do they generally specify more than 256 unique PCI buses for purposes of configuration read or write operations.

In contrast, larger computer systems may connect several hundred PHBs, and therefore, may configure many more than the 256 PCI buses that can be represented with a single 8-bit PCI bus number. In particular, for purposes of electrical and bus protocol isolation between individual PCI devices, the IBM iSeries and pSeries computers, for example, provide each PCI device connection to PCI adapter card through a PCI-PCI bridge on the PHB bus. Therefore, in these systems each PHB bus is capable of connecting as many as ten PCI adapter cards and upwards of 128 PHBs. As a result thereof, the base hardware configuration may include more than a thousand individual PCI buses. Since it is the practice of some PCI device manufacturers to use a PCI-PCI bridge within a PCI adapter card as a device to integrate multiple PCI devices behind a single PCI connection to the computer's PCI buses, additional PCI buses are created with the use of these classes of PCI adapter cards.

Additionally, the hypervisor and the partition operating systems may use different forms of physical identification for PCI device and functions numbers within the overall computer system. In particular, the hypervisor may modify the configuration device number of a PCI bus device as it is known to an operating system in a logical partition, as a means to protect the identify and access to other devices on that PCI bus that are assigned to other logical partitions. As a consequence of this, the partition operating system may specify a configuration address device number that is not the same as or equivalent to the hypervisor or physical device number used during configuration operations to a particular device.

The operating system in a particular partition generally determines the configuration of PCI buses and devices available to it from within the possibly larger configuration of PCI buses and devices forming the overall computer system and used among different logical partitions. It is desired in logical partitioning to permit operating systems in a particular logical partition to require little, if any, change in design to operate within a logical partition, so that the hypervisor provides program call interfaces similar to or duplicating the program call interfaces of the system firmware or BIOS of a non-partitioned computer. Thus, the operating system of a logical partition can perform its normal PCI bus walk functions unmodified from its original form and still operate to control the substantially larger number of devices in the tree.

With the initialization process aside, when the computer CPU accepts an interrupt signal from the interrupt controller, it generally enters into a state in which it temporarily inhibits or ignores other interrupt conditions and delivers program control to the operating system. The operating system may then call the firmware to inhibit additional interrupts from the interrupt controller input generating the interrupt signal. The operating system then invokes each device driver program that is associated through the interrupt request queue with that interrupt controller input. When all device driver interrupt programs have completed, the operating system again calls the firmware to re-enable the interrupt controller to transmit interrupts from the various interrupt sources.

Logically partitioned computer systems commonly include several hundred PCI bus trees and several thousand PCI devices. In this type of configuration, it is impractical and limiting to system performance to provide an interrupt controllers for all of the devices. Rather, such computer systems generally provide a mechanism for receiving 8,16, or 32 interrupt inputs per PCI bus tree, such that the total number of interrupt controller sources across all PCI buses in the overall computer system may be also on the order of thousands.

The operating systems for small computers, such as Windows and Linux, expect that the underlying computer hardware has a limited number of interrupt controller inputs. Therefore, these smaller computer-based operating systems are designed with a relatively small number of interrupt request queues to associate with each interrupt controller input. Linux, for example, provides for up to 256 interrupt request queues. Although these types of small computer operating systems are also useful as an operating system of one partition of a logically partitioned system, they are not designed the very large number of interrupt sources generated by the hardware of larger computer systems and networks.

Furthermore, with regard to the internal facilities of the PCI devices themselves, such as, for example, control or status registers and data buffers, these registers and buffers are generally associated with a range of contiguous PCI memory and IO addresses on a particular PCI bus. A PHB or PCI bridge generally includes facilities to define the range of addresses that encompass each of these physical spaces. Basic communications between the computer system CPU and PCI devices, between PCI devices connected to a PCI bus, or within the same PCI bus tree generally include read and/or write commands that then specify PCI memory or IO addresses correlating to these PCI device internal facilities. Each PCI device that requires PCI memory or IO space to map its internal facilities generally has up to six registers that can be read or written by other configuration-type operations of the PCI bus to indicate the size and address alignment required for that space, and to allow software in the computer system to dynamically, at each device boot, assign the specific range of PCI memory or IO space associated with that space.

In order to further enable computer programs to control or monitor a PCI IO device adapter and/or to transfer data to or from this adapter, the PCI memory or IO space addresses of the PCI IO device adapter internal facilities are generally in turn associated with particular address ranges on the computer memory bus. This allows the computer CPU instructions to read and/or write these IO device adapter facilities as if they were a segment of the computer memory. The collective PCI memory and IO addresses of all PCI devices beneath a PHB are generally correlated one-to-one with contiguous address ranges on the computer memory bus, with the general requirement that each PHB address range be unique from others on the memory bus and that they are unique relative to real memory address ranges on the memory bus. Within a PCI bus tree the memory and IO space address ranges of each device, or each bus created by a PCI bridge are generally contiguous ranges within a larger memory or IO space address range than the PCI bus above it. Thus, each branch in a PCI bus tree may use a segment of the larger PCI memory and IO address ranges assigned to the branch above it.

On a PCI bus, generally PCI IO addresses may be either 16 or 20 bits in length, correlating to a 64 KB or 1 MB space, respectively. Because the PHB generally defines the overall IO space for all IO addresses in the tree beneath it, all IO addresses are generally limited to the range defined or implemented by the PHB. Similarly, on a PCI bus, PCI memory addresses may be either 32 or 64 bits, and all PCI memory addresses in the tree beneath a PHB are generally limited to the range defined for that PHB. These ranges may be determined in part by the capabilities of the PHB or PCI bridge that creates a secondary PCI bus in the tree from a PCI bus closer to the root bus, and in part by the software or firmware that allocates memory bus addresses to PHBs so that they do not overlap each other or the real memory implemented in that computer.

In order to determine the size of the PCI memory and IO space required in each PCI bus device tree, along with which memory bus address ranges should then be assigned to each PHB and PCI IO device adapter in those trees, system software generally must first determine the configuration of each PCI bus tree. In many computer systems "system firmware" or "boot software" determines the configuration of PCI buses and devices included in the computer system at system boot or IPL time.

The hardware structure of computer systems capable of logical partitioning commonly have multiple CPUs, very large main storage, and many IO buses and IO device adapters, such as the AS400/iSeries computer which is capable of configuring upwards of 128 to 256 IO buses. Such systems typically have large memory bus addresses, which may be on the order of 40 to 64 bits in length. The hypervisor of a logically partitioned system generally assigns memory bus address ranges to each root PCI bus (PHB) from within the overall memory bus addressing capabilities and such that they do not duplicate address ranges occupied by real memory. In a computer system with a large memory bus address, the hypervisor may assign a full 32-bit or even a somewhat larger, address range to each PHB, and the PCI bus memory or IO space address ranges assigned to IO device adapters on one PCI bus may then duplicate the memory or IO addresses for other PCI buses.

In contrast, small computers such as PCs and workstations typically implement only one or two IO buses connected to the CPU/Memory complex and often implement only 32-bit memory bus addresses. Computer operating systems designed for 32-bit computer systems, such as Windows, OS2, Linux, and AIX, however, can represent only 32-bit PCI memory or IO space addresses, both of which generally must be defined uniquely within the overall 32-bit address space defined for real memory and PCI addresses. These operating systems assign PCI bus and IO device adapter memory and IO space ranges such that the addresses assigned to IO device adapters on one PCI bus do not duplicate those of IO device adapters on other PCI buses within the same computer.

Therefore, in view of conventional systems, there is a need for a method for determining the connection of interrupts for PCI devices available to a particular operating system in a logically partitioned system. Additionally, there is a need for a method to enable and disable the signaling of interrupts from a PCI device using a hypervisor program to assure that the operating system of a logically partitioned computer system correctly receives the interrupt signals from devices assigned thereto. Further, there is a need for a hypervisor capable of enabling and disabling the signaling of interrupts associated with the PCI devices assigned to thereto without affecting the signaling of interrupts for PCI devices assigned to other logical partitions.

Further still there is a need for a method for conducting PCI bus and device detection in a logically partitioned system. In particular, there is a need for a method in which a hypervisor of a logically partitioned system may represent the PCI device number of a device, as this number is known to the operating system of the logical partition, differently than the actual PCI device number used to perform configuration read and write operations to that device and/or differently than it is known to the hypervisor. Further still, there is a need for a method through which PCI initialization functions of an operating system in a logically partitioned system may build a translation between the PCI bus and device numbers known to the operating system and those that may be known to the hypervisor or those used to perform configuration read and/or write operations.

Further still, there is a need for a method that allows a hypervisor of a logically partitioned computer system to determine the PCI device configuration of all PCI bus trees in the overall computer system and to choose PCI memory and IO space addresses for the PCI devices in these trees without regard to the number or types of operating systems in the computer system.

SUMMARY OF THE INVENTION

Embodiments of the present invention generally provide a method for detecting PCI buses in a logically partitioned system. The method may include determining PCI buses that are accessible to a guest operating system via querying a hypervisor, generating a PCI controller list, wherein a PCI controller exists for each determined PCI bus, and constructing a PCI bus structure for each PCI controller in the PCI controller list. The method may further include calling a platform dependent device detection code to detect PCI devices accessible to the logically partitioned system, and connecting to each function of each detected PCI device to authorize the guest operating system to conduct configuration IO operations thereon through a platform dependent code operation.

Embodiments of the present invention further provide a method for detecting PCI buses and devices in a logically partitioned system, wherein the method includes determining PCI buses owned by a guest operating system of the logically partitioned system with an architecture dependent code program, and building a PCI controller list representative of each PCI controller corresponding to each PCI bus determined to be owned by the guest operating system with an architecture dependent code action. The method may further include constructing a PCI bus device software structure for each PCI controller in the controller list with an architecture dependent code program, passing the PCI BUS device software structure to a bus scanning code with an architecture dependent code program, and executing a PCI device detection process with an architecture dependent code program. Further still, the method may include authorizing the guest operating system to perform configuration IOs with each function of each device detected with an architecture dependent code program, and executing an architecture independent PCI BIOS initialization slot scanning code.

Embodiments of the present invention further provide a computer readable medium storing a software program that, when executed by a processor, causes the processor to perform a method for a method for detecting PCI buses in a logically partitioned system. The method may include determining PCI buses that are accessible to a guest operating system via querying a hypervisor, generating a PCI controller list, wherein a PCI controller exists for each determined PCI bus, and constructing a PCI bus structure for each PCI controller in the PCI controller list. The method may further include calling a platform dependent device detection code to detect PCI devices accessible to the logically partitioned system, and connecting to each function of each detected PCI device to authorize the guest operating system to conduct configuration IO operations thereon through a platform dependent code operation.

Embodiments of the present invention may further provide a computer readable medium storing a software program that, when executed by a processor, causes the processor to perform a method for a method for detecting PCI buses and devices in a logically partitioned system. The method may include determining PCI buses owned by a guest operating system of the logically partitioned system with an architecture dependent code program, and building a PCI controller list representative of each PCI controller corresponding to each PCI bus determined to be owned by the guest operating system with an architecture dependent code action. The method may further include constructing a PCI bus device software structure for each PCI controller in the controller list with an architecture dependent code program, passing the PCI BUS device software structure to a bus scanning code with an architecture dependent code program, and executing a PCI device detection process with an architecture dependent code program. Further still, the method may include authorizing the guest operating system to perform configuration IOs with each function of each device detected with an architecture dependent code program, and executing an architecture independent PCI BIOS initialization slot scanning code.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally allows a logically partitioned system to determine the physical connection of various interrupts for PCI devices available to the partition, wherein the PCI devices may reside in a nested and/or tree-structured environment. Additionally, the present invention generally allows the partition to enable and disable the signaling of interrupts from a PCI device using a hypervisor program, which insures that the operating system of a logically partitioned computer system correctly receives the interrupt signals from devices assigned thereto. Further still, the present invention generally allows a hypervisor to enable and disable the signaling of interrupts associated with the PCI devices assigned to thereto without affecting the signaling of interrupts for PCI devices assigned to other logical partitions in a logically partitioned system.

Figure 1:
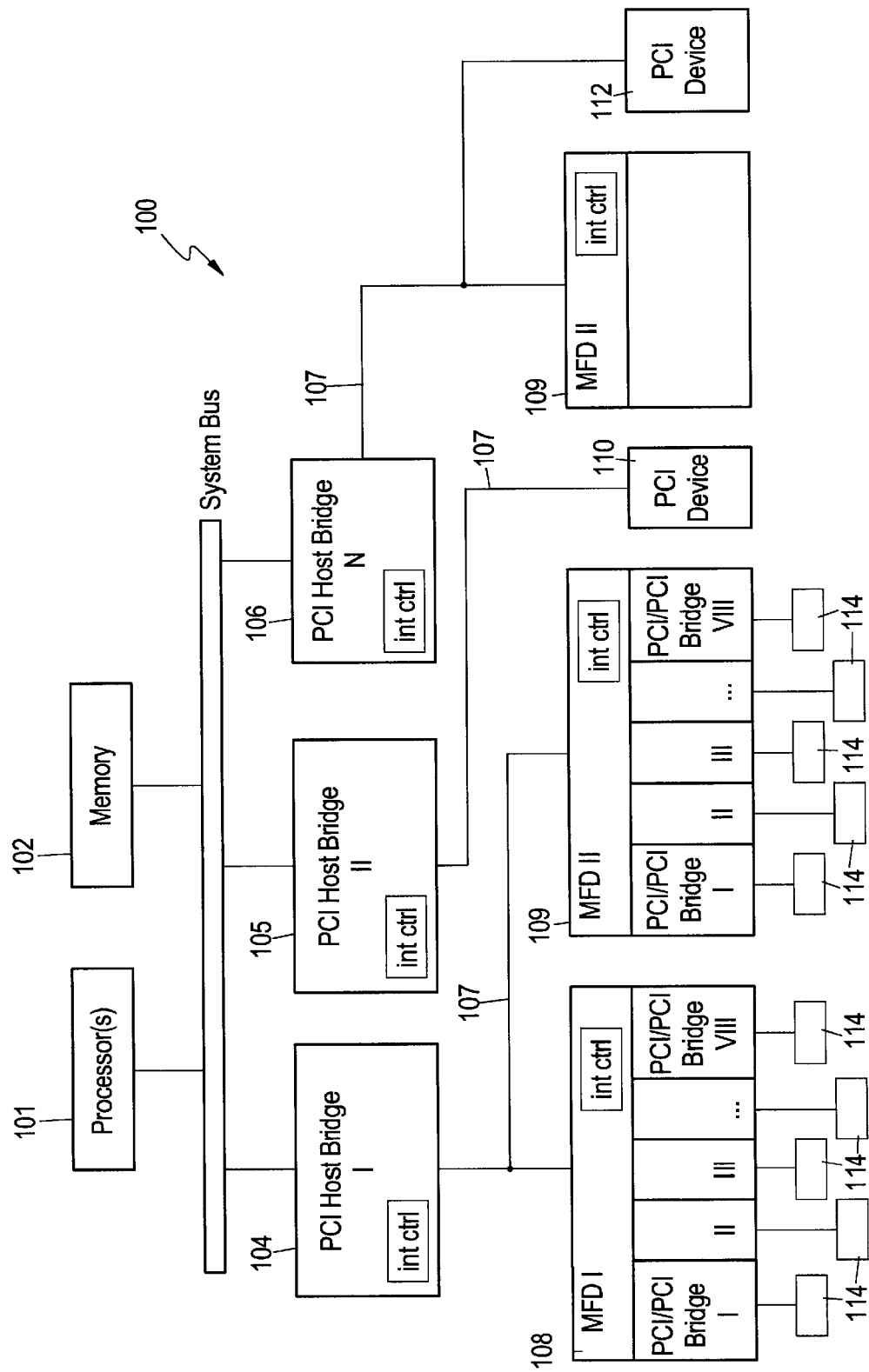
FIG. 1 illustrates an exemplary hardware configuration of an embodiment the present invention.

In a first exemplary embodiment of the present invention, a method by which the initialization program(s) of an operating system in a logical partition determine the physical interrupt controller input associated with the interrupt output(s) of a PCI bus device is provided. FIG. 1 illustrates an exemplary hardware configuration 100, i.e., IBM's iSeries configuration, wherein the method of the present invention may be implemented. FIG. 1 illustrates processor(s) 101 and memory 102 in communication with a system bus 103. PCI Host Bridges (PHBs) 104, 105, & 106 are also in communication with the system bus 103. A primary PCI bus connects each of PHBs 104, 105, & 106 with either multifunction devices (MFDs) 108, 109, & 111 or PCI devices 110 & 112. Each of the MFDs include a plurality of PCI/PCI bridges 113, which may be 8 for example, each of which are in communication with a PCI slot 114.

The exemplary method may be further configured to determine the physical interrupt controller inputs in a system where the number of interrupt controller input sources exceeds the number of interrupt request queues. For example, if the configuration of FIG. 1 included a substantial number of MFDs in communication with a multiple of 8 times that number of PCI slots in addition to several hundred PCI devices, then the number of interrupt sources would substantially outnumber the available interrupt request queues, which is generally 256 in an iSeries configuration. The exemplary method generally includes an initialization program that determines the physical interrupt routing from each PCI device in the system to the respective computer interrupt controllers that present interrupts to the computer system CPUs. In an IBM iSeries configuration, for example, a PCI-PCI bridge from a PHB bus may connect to each PCI bus card slot. This type of bridge configuration, therefore, may provide interrupt routing and control capabilities for the particular slot. As such, a multiplicity of such bridges may be combined into a single PCI multifunction device operating to aggregate the interrupt outputs of each bridge into a single interrupt output signal from the multifunction bridge. The interrupt output of the multifunction device may in turn be connected to an interrupt input of a PHB. Thus, the PHB may create a CPU interrupt upon receiving an interrupt signal on an interrupt input from the multifunction device.

The method of the present exemplary embodiment utilizes an initialization-type program to detect each PHB that connects devices assigned to a particular operating system, and then locates each multifunction bridge device connected to the respective PHB buses. The initialization program generally analyzes each PCI-PCI bridge function of the multifunction device in order to detect the presence of PCI adapter cards in communication therewith. The initialization program may further utilize the PCI configuration address, which generally is composed of the corresponding PHB identification, PCI subordinate bus number, and the PCI device and function numbers of each of the respective slots to represent a unique physical interrupt controller.

However, initialization-type programs in an iSeries-type partition, for example, are generally not permitted to directly access the I/O hardware. Therefore, in order for an iSeries-type initialization program to access the I/O hardware information, the initialization program calls a hypervisor program that has access to the I/O information of the hardware devices. Thus, in order to locate PHBs that contain PCI adapters that the partition is authorized to use in an iSeries configuration, it follows that the initialization program uses a hypervisor call to test for the existence of each PCI bus. The hypervisor program may respond, for example, positively for the particular buses that may be used by the respective partition, and negatively or not at all for those buses that are not available to the respective partition.

Once a PHB has been located, the initialization program may again call the hypervisor program to test for the existence of a PCI device at each possible PCI device number on the bus. Again, for example, a positive response may indicate that a device exists at the particular device number tested. In this situation the hypervisor program may return a descriptor parameter that may be used to identify what kind of device was found at the particular location/address. A negative or null response may indicate that no device was found at the tested location/address. If the device is found and determined to be a multifunction device with PCI-PCI bridges to PCI card slots, then the initialization program may call the hypervisor program to test each of the possible slots, 8 for example, of the PCI-PCI bridge. In testing the PCI-PCI bridge, the hypervisor may use the hypervisor slot address as input. A positive response by the hypervisor may indicate that the current logical partition is authorized to use the slot. Therefore, the initialization program may associate the hypervisor address of the slot as a physical interrupt controller for the slot interrupt.

Figure 16:
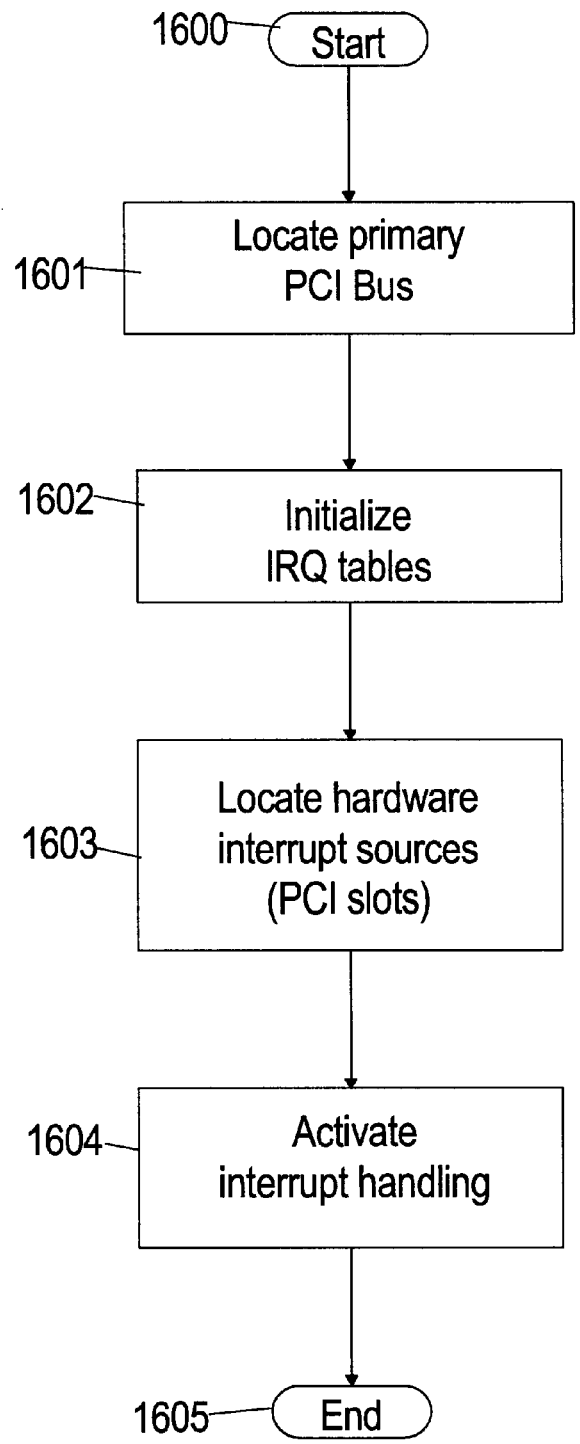
FIG. 16 illustrates a general flowchart of a PCI initialization process.

A general and high-level initialization process for an embodiment of the present invention is illustrated in FIG. 16. At step 1600 the exemplary method begins and continues to step 1601 where the method locates the primary PCI buses of the system. At step 1602 the exemplary method conducts an initialization process for the IRQ tables and continues to step 1603. At step 1603 the method locates hardware interrupt sources, which may be, for example, PCI slots in the present exemplary embodiment. At step 1604 the present exemplary method activates an interrupt handling process and then the exemplary method ends at step 1605.

Figure 3:
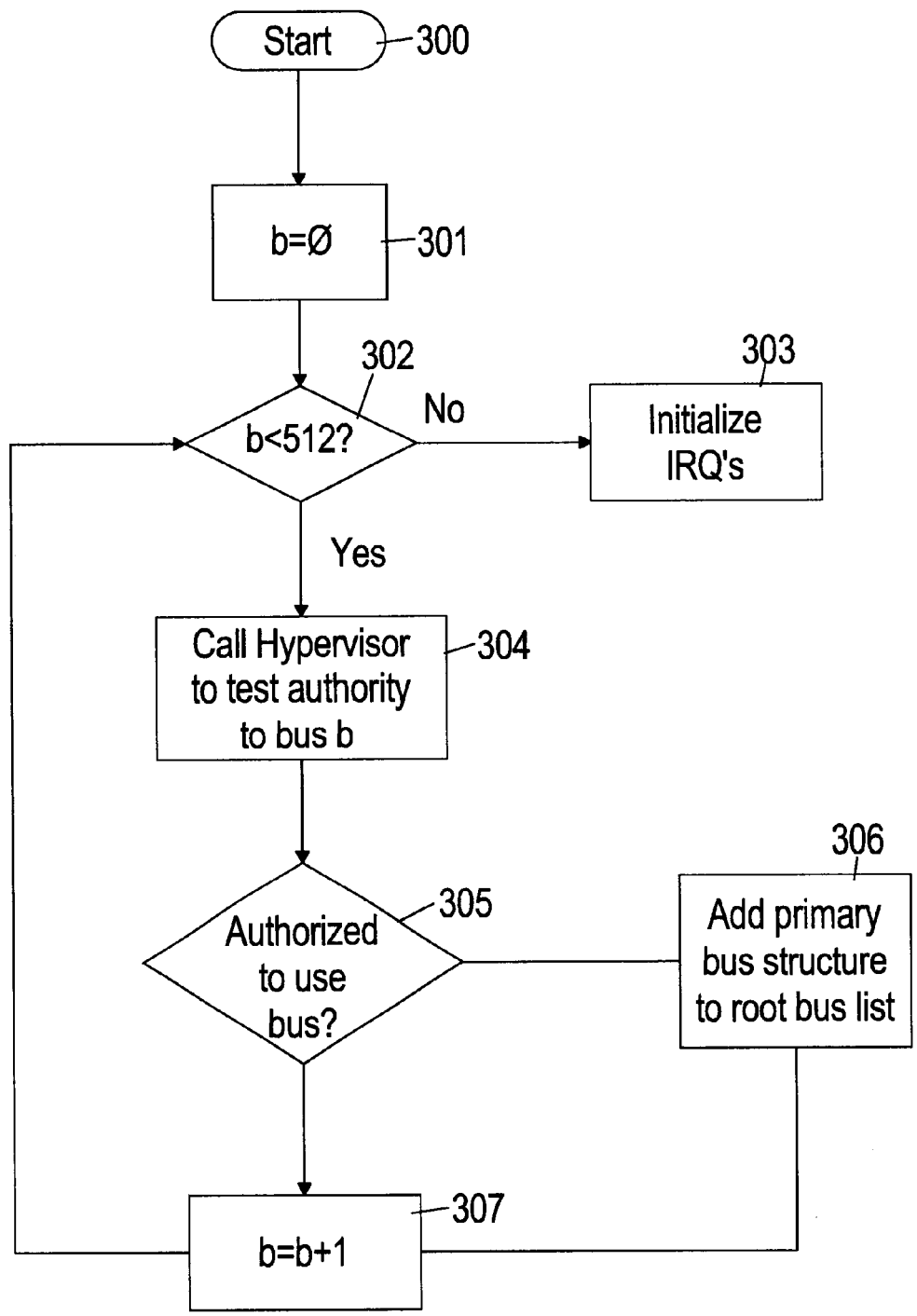
FIG. 3 illustrates an exemplary process of locating primary PCI buses in a Linux-based environment.

FIG. 3 illustrates an exemplary process of locating the primary PCI buses when the methodology is implemented in a Linux-based environment. The exemplary method begins at step 300 and at step 301 a variable (b) will represent the bus number being tested is initialized to zero. At step 302 the exemplary method determines if the bus variable is less than 512, for example, which may be the number of possible PCI buses in a Linux configuration. If the bus variable is not less than 512, then the method has essentially tested all possible bus locations, and therefore, the method continues to step 303, which represents the process of initializing the IRQs for the system. If the bus variable is less than the number of possible PCI buses, then the method continues to step 304 where the hypervisor is called to test the authority of bus number (b). At step 305 the method determines if the system is authorized to use bus number (b). If so, the method continues to step 306 where the primary bus structure of bus (b) is added to a root bus list before continuing to step 307. If not, then the method simply continues to step 307 where the bus number is incremented. Thereafter the method returns to step 302 and determines if the current/incremented bus number is less than the number of possible PCI busses. This flow continues until all possible buses have been tested.

Once the primary buses are located at step 1601 in FIG. 16, then the method continues to step 1602, where an IRQ table initialization process in conducted. This process generally includes building at least one table that may be used to map the interrupt controller structure for each system interrupt. In particular, the interrupt controller structure may include a collection of pointers corresponding to each IRQ, wherein the collection of pointers, which may be one or more pointers, indicates the location of routines that are to be executed upon encountering a particular interrupt. The respective routines are generally configured to handle various specific tasks and/or take various actions associated with interrupt control for the respective interrupts.

The IRQ initialization process, aside from creating the interrupt controller structure of pointers to routines, may also execute additional operations relative to other steps in the exemplary methodology. For example, the initialization process may include registering an interrupt handler for PCI logical partition events. The initialization process may additionally operate to open a path for logically partitioned events to be communicated to the hypervisor.

Figure 2:
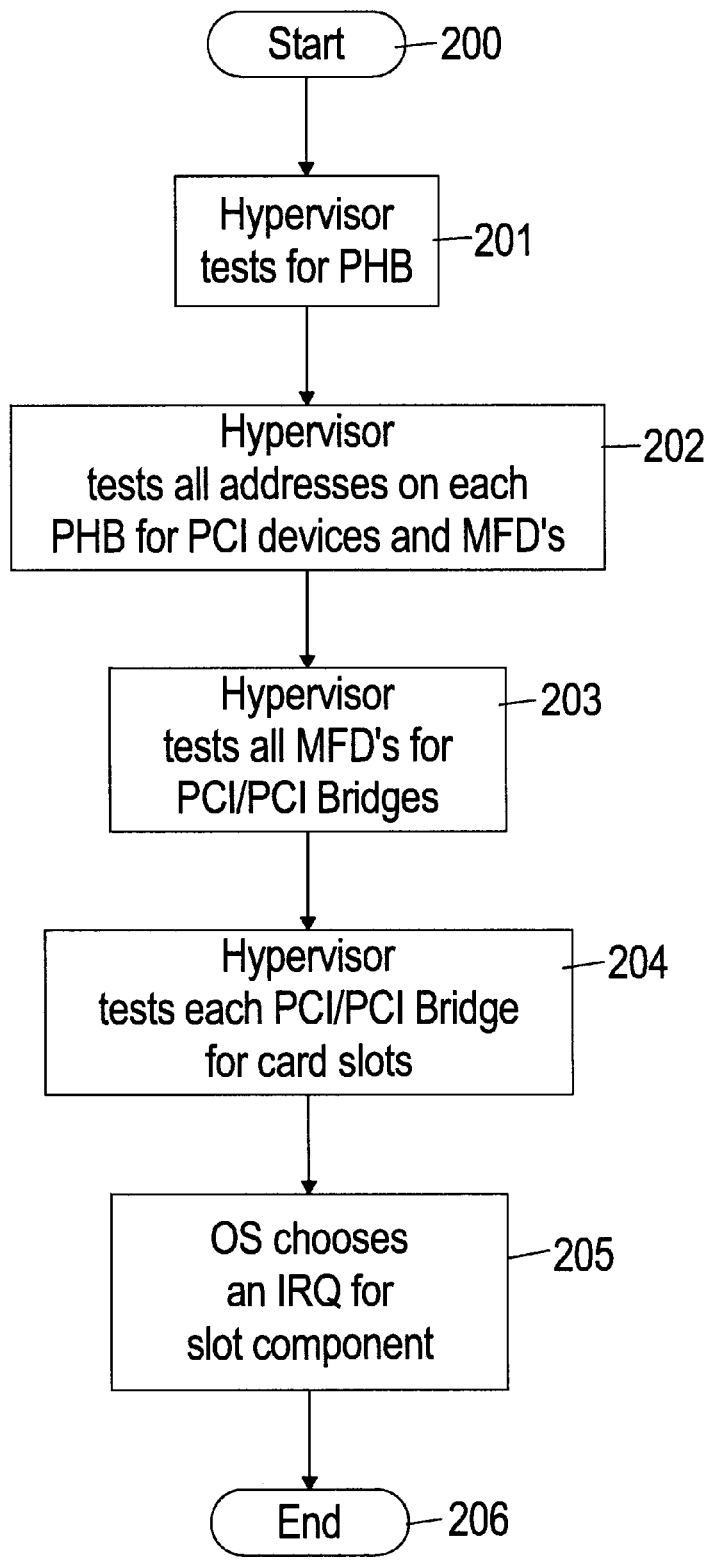
FIG. 2 illustrates a high level flowchart of an initialization method of an embodiment of the present invention.

FIG. 2 illustrates a high level flowchart of a portion of the exemplary initialization method of the present invention, and in particular, FIG. 2 illustrates a high level flowchart of a locate hardware interrupt sources routine. The method begins at step 200 and continues to step 201 where the hypervisor tests for PHBs in communication with the system bus. At step 202, the hypervisor tests all addresses on each PHB found in step 201 for PCI devices and MFDs. At step 203 the hypervisor tests each MFD found in step 202 for PCI/PCI bridges thereon. At step 204 the hypervisor tests each PCI/PCI bridge found in step 203 for card slots thereon. At step 205 the operating system chooses an IRQ to correspond to each slot component.

Figure 4:
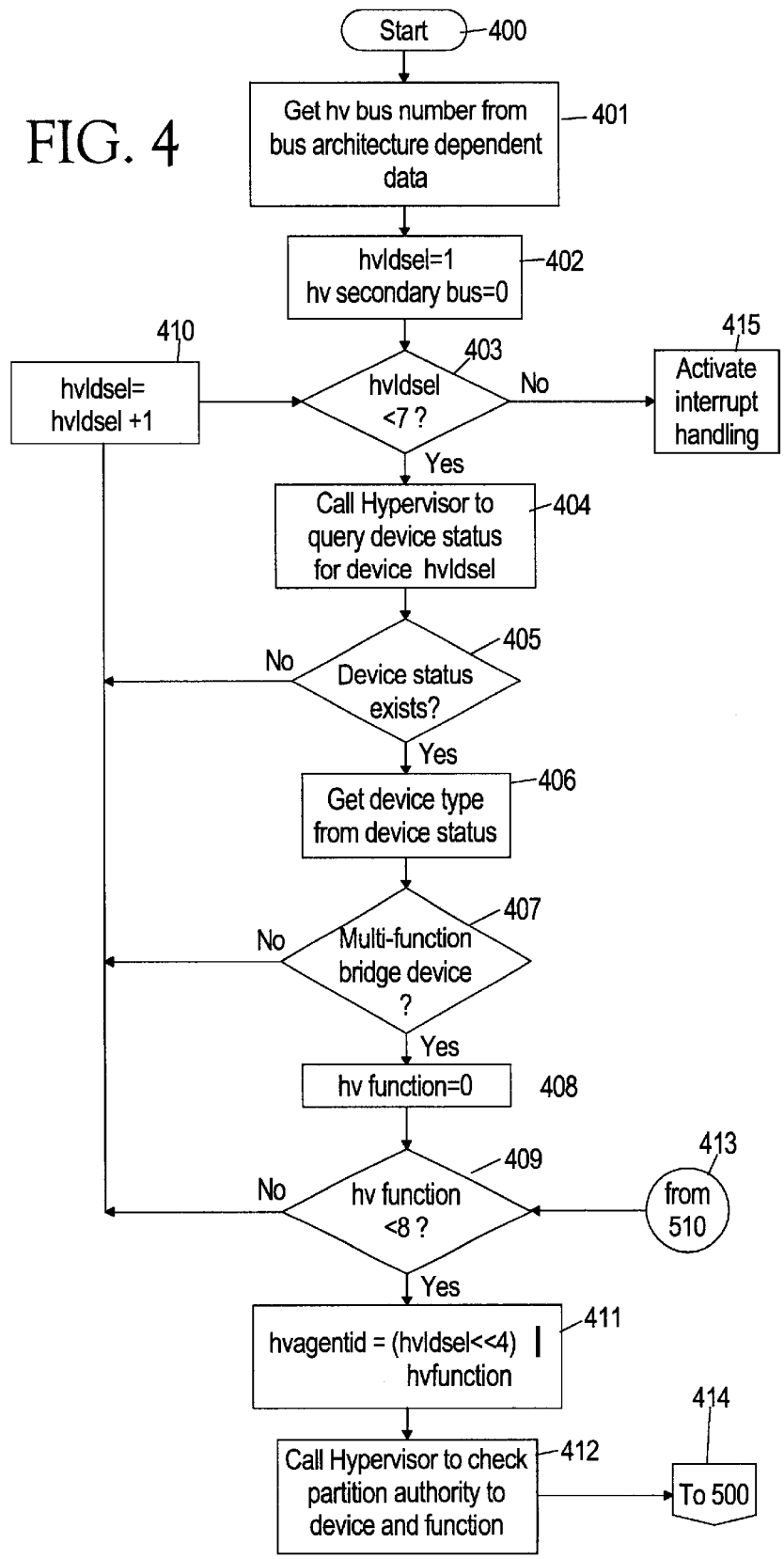
FIG. 4 illustrates an exemplary bus walk process of an embodiment of the present invention in a Linux-based system.

FIG. 4 illustrates an exemplary flowchart for a method of locating hardware interrupt sources for each individual bus in a logically partitioned configuration, and in particular, the exemplary flowchart of FIG. 4 may be implemented as the bus walk process in a Linux-based system. The method shown in Figure begins at step 400 and continues to step 401 where the hypervisor bus number is retrieved from the bus architecture dependent data. At step 402 incremental parameters of the locate hardware methodology are initialized. For example, a hypervisor identification select value may be set to one and a hypervisor secondary bus value may be set to zero at step 402. At step 403 the method determines if the hypervisor identification select value is less than a predetermined number, which may be 7 for a Linux-based system. If the identification value is not less than 7, for example, then the method may continue to step 415, which represents activation of the interrupt handling routine, which will be discussed herein. If the hypervisor identification select parameter is determined to be less than 7 at step 403, then the method continues to step 404 where the hypervisor is called to query the device status of the device designated by the hypervisor identification select parameter. At step 405 the method determines of the device status exists, and if not then the method continues to step 410 where the hypervisor identification select parameter is incremented. If the device status exists, then the method continues to step 406 where the type of the device is determined from the status of the device. Once the device type is ascertained from the device status, the method continues to step 407 where it is determined if the particular device is a MFD. If not, then the method continues to step 410, and if so, then the method continues to step 408 where a hypervisor function parameter is set to zero. At step 409 the method determines if the hypervisor function parameter is less than 8, which generally represents the number of PCI/PCI bridges in a MFD. If the value is not less than 8, then the method continues to step 410. If the value is less than 8, then the method continues to step 411 where a hypervisor agent identification parameter is set equal to the hypervisor identification select parameter shifted down by 4 and then logically combined with the hypervisor function value in a logical "OR" operation. At step 412 the hypervisor is called to check the authority of the particular partition to access the particular device. Thereafter, the method continues to step 414, which corresponds to the beginning of the exemplary flowchart shown in FIG. 5.

Figure 5:
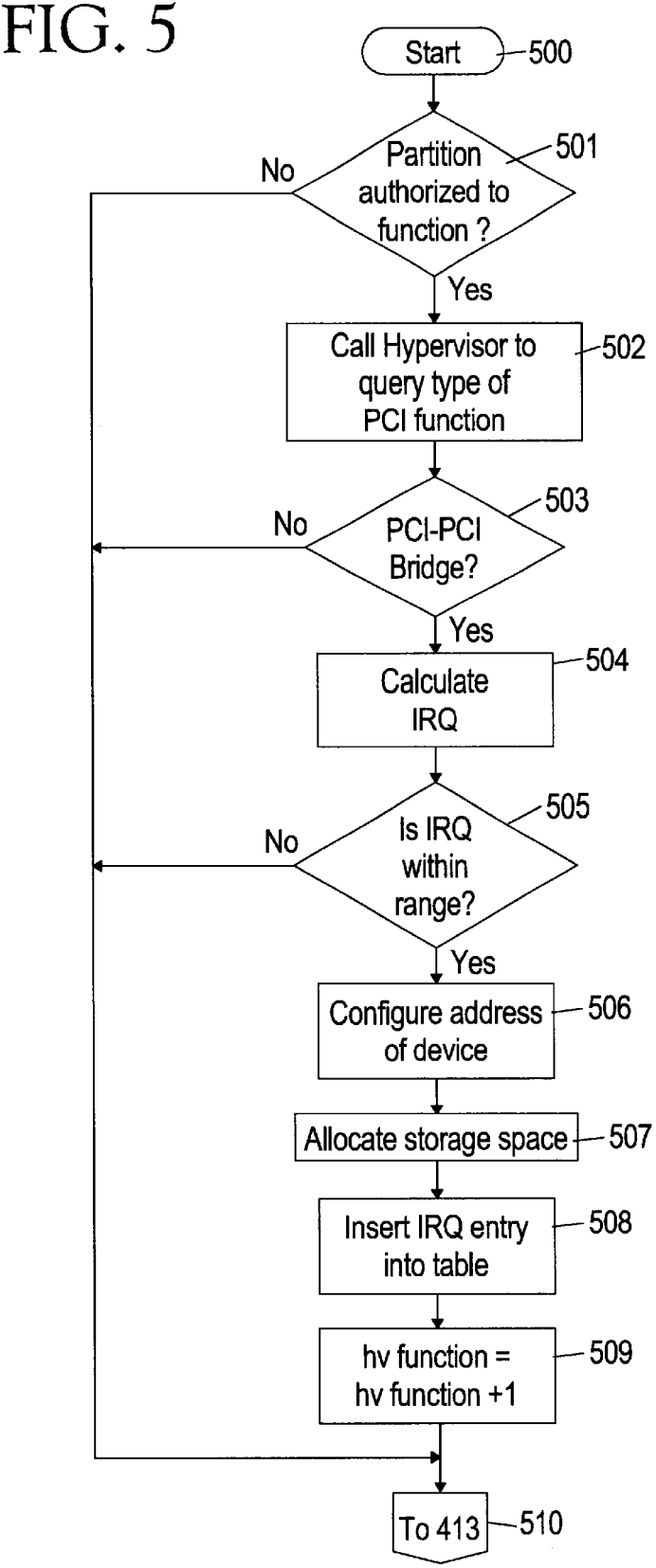
FIG. 5 illustrates a continuation of the bus walk process shown in FIG. 4.

FIG. 5 represents a continuation of the flowchart illustrated in FIG. 4, as step 413 of FIG. 4 continues to step 500 of FIG. 5. Further, the terminating step of FIG. 5, step 510, feeds back into the flowchart of FIG. 4 at step 413. At step 501 the method determines if the partition is authorized to access the function. If not then the method falls out of the sequence to step 510, which returns to the flowchart in FIG. 2, as the partition does not have access to this particular device function. If the partition is authorized, then the method continues to step 502 where the hypervisor queries the type of the PCI function. At step 503 the hypervisor specifically determines of the function is a PCI/PCI bridge. If not, the method falls out to step 510. If so, then the method continues to step 504 where an IRQ value for the bridge is calculated. The IRQ may be calculated in accordance with the following equation:

$$IRQ=(((B-1)*16+(I-1)*8+F)*9/8) \bmod 254)+1,$$

wherein "B" represents a hypervisor bus number, "I" represents a hypervisor device number of a slot, which may be termed an identification select and/or idsel herein, and "F"

represents a hypervisor function number of a slot. At step 505 the method determines if the calculated IRQ is within a predetermined range for the current system. If not, then the method returns to step 501, and if so, then the method continues to step 506. At step 506 the method configures the address of the current device. At step 507 the method allocates storage space for the calculated IRQ entry and at step 508 the method inserts the calculated IRQ entry into the table. At step 509 the method increments the hvfunction value and continues to step 510, which returns to step 413 in FIG. 4.

Figure 17:
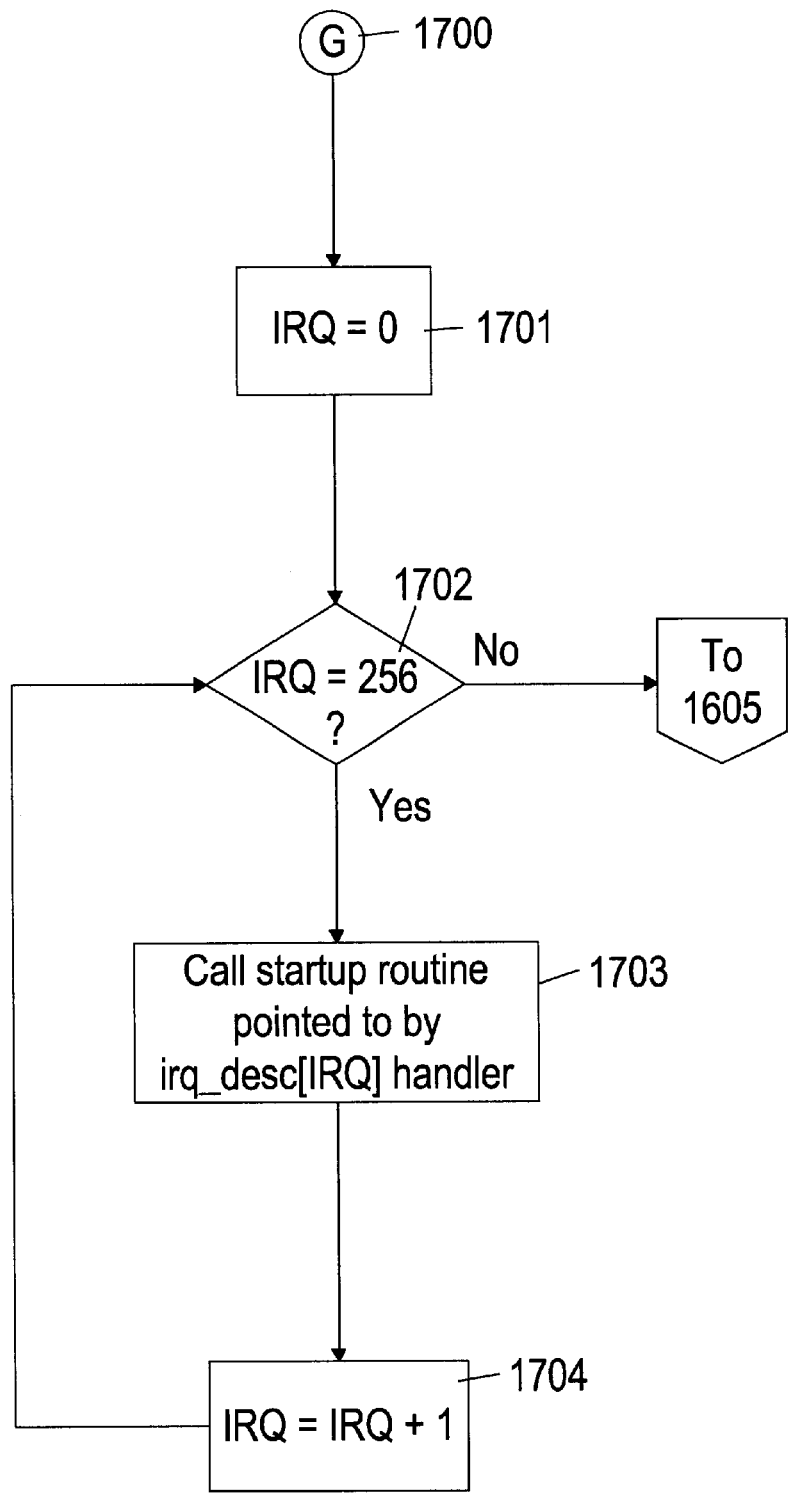
FIG. 17 illustrates an exemplary flowchart of a method for activating interrupt handling in an embodiment of the present invention.

FIG. 17 illustrates an exemplary flowchart for a process of activating interrupt handling, for example, in an iSeries Linux environment. The exemplary method begins at step 1700 and at step 1701 the method initializes a variable representing the number of IRQs to be processed. In the present exemplary embodiment the representative variable is IRQ and the initial value is 0. After initialization the method continues to step 1702 where the method determines if the IRQ value is less than the maximum number of possible IRQs. Since Linux systems generally include 256 interrupts, the maximum number may be set to 256. Thereafter, if the IRQ number is not less than 256, then the activation process ends and returns to step 1605 in FIG. 16. If the IRQ value is determined to be less than 256, then the method continues to step 1703 where the method calls a startup routine pointed to by a pointer that is dependent upon the current IRQ number. The respective routine may be called and the respective interrupt handler activated as a result of the routine's execution. This routine, in the present exemplary embodiment, for example, may utilize the iSeries architecture dependent structure generated in the initialization process. Thereafter the exemplary method may continue to step 1704, which operates to increment the IRQ number to the next IRQ before returning to step 1702. Therefore, the combination of steps 1702–1704 may operate to incrementally call startup routines for each interrupt on the system.

Figure 18:
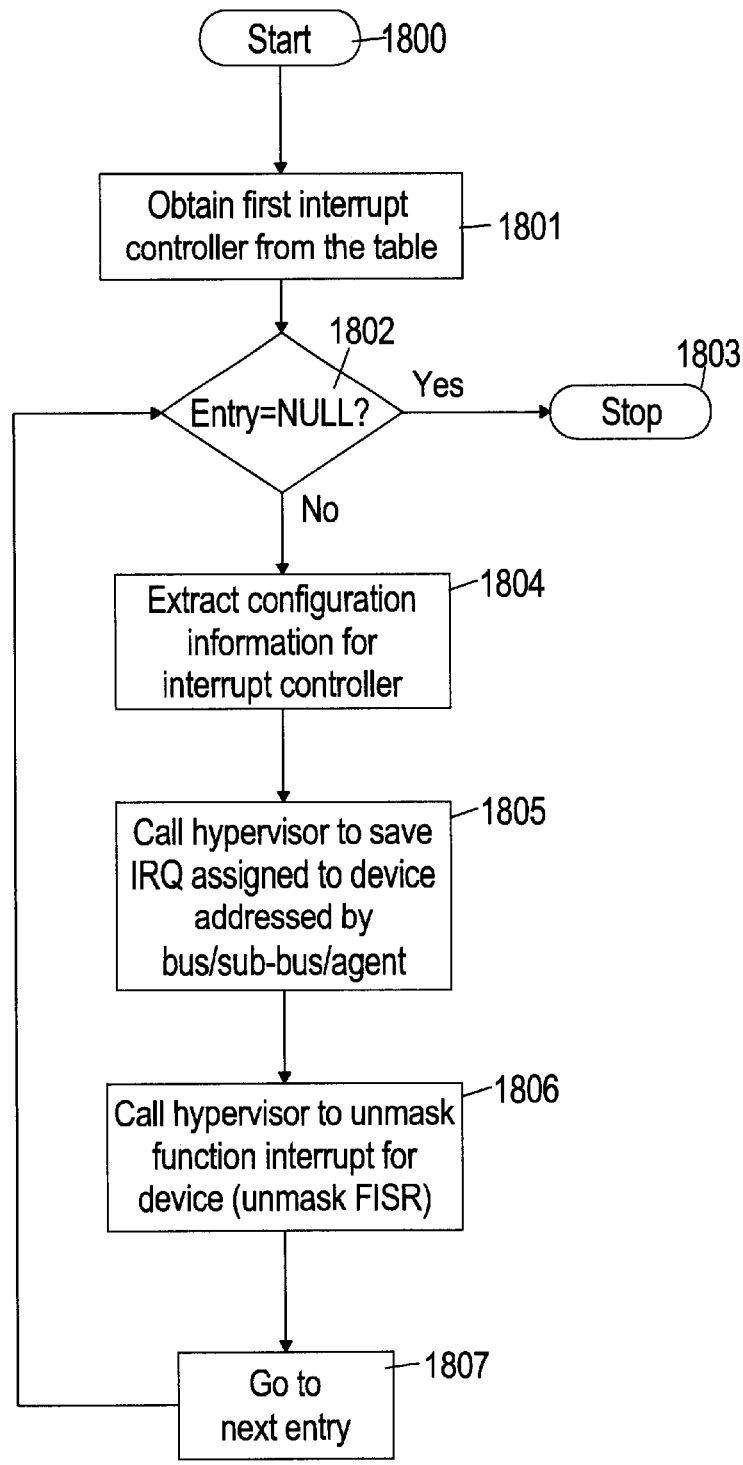
FIG. 18 illustrates an exemplary hardware controller startup routine of an embodiment of the invention.

FIG. 18 illustrates an exemplary flowchart of a method that begins at step 1800 and at step 1801 obtains a table entry to the first interrupt controller associated with an IRQ number. The method continues to step 1802 where the method determines if the table entry value obtained is null. If so, the method continues to step 1803 where the routine returns to the caller. If the table entry is not null, another interrupt controller is associated with the IRQ and the method continues to step 1804 where the configuration information for the interrupt controller is obtained. The method continues to step 1805 where the hypervisor is called to save the IRQ number assigned to the device. The exemplary method continues to step 1806 where the hypervisor is called to, for example, unmask function interrupts for the device. Thereafter, the method continues to step 1807 where the next table entry is obtained before returning to step 1802. Therefore, the combination of steps 1802–1807 may operate to activate interrupt handling for each interrupt controller.

In another exemplary embodiment of the present invention the initialization program is configured to associate a PCI bus hardware interrupt controller interrupt signal with a particular operating system interrupt handling program that is specific to a particular hardware interrupt. The initialization program may construct a table having associations between hardware interrupt controller signals and the respective operating system, PCI bus device drivers, and hypervisor programs to respond to and enable or disable interrupt signals originating at the hardware interrupt controller. The present exemplary embodiment may further include sending a program call to the hypervisor in order to communicate the association between the operating system IRQ and a hardware interrupt controller signal. This program call may allow the hypervisor to enable and disable hardware interrupt signals associated with the current IRQ.

Within the operating system of the present exemplary embodiment, an interrupt request queue, again termed an IRQ, is a programming construct that represents a collection of operating system programs and device driver programs that are configured to respond to and control PCI bus interrupts associated with particular PCI bus devices. An initialization program may be configured to create a table that associates one or more physical interrupt controller interrupt signals with a single operating system IRQ. Once the physical interrupt controllers are determined found, each interrupt controller may be assigned to a single IRQ. The initialization program may then create a table with one entry for each unique IRQ recognized by the operating system, which may be 256 total entries in a Linux based operating system, for example. The operating system may commonly associate each IRQ with a number, termed an IRQ number, that serves uniquely identify that particular IRQ within the operating system to other programs. Therefore, the table of the present exemplary embodiment consists of entries that may be generally identified by an IRQ number, wherein each entry of the table includes the identification of the hardware interrupt controllers associated with the IRQ.

As the initialization program goes through the process of detecting the physical interrupt controllers, the initialization program may choose an IRQ and an IRQ number to correspond thereto. The hypervisor address of the physical interrupt controller may then be pushed onto a stack of controller entries for that particular IRQ. Each individual IRQ may also be associated with a list of programs that include programmatic functions to perform interrupt control, such as to enable or disable interrupt signals associated with that particular IRQ.

Figure 19:
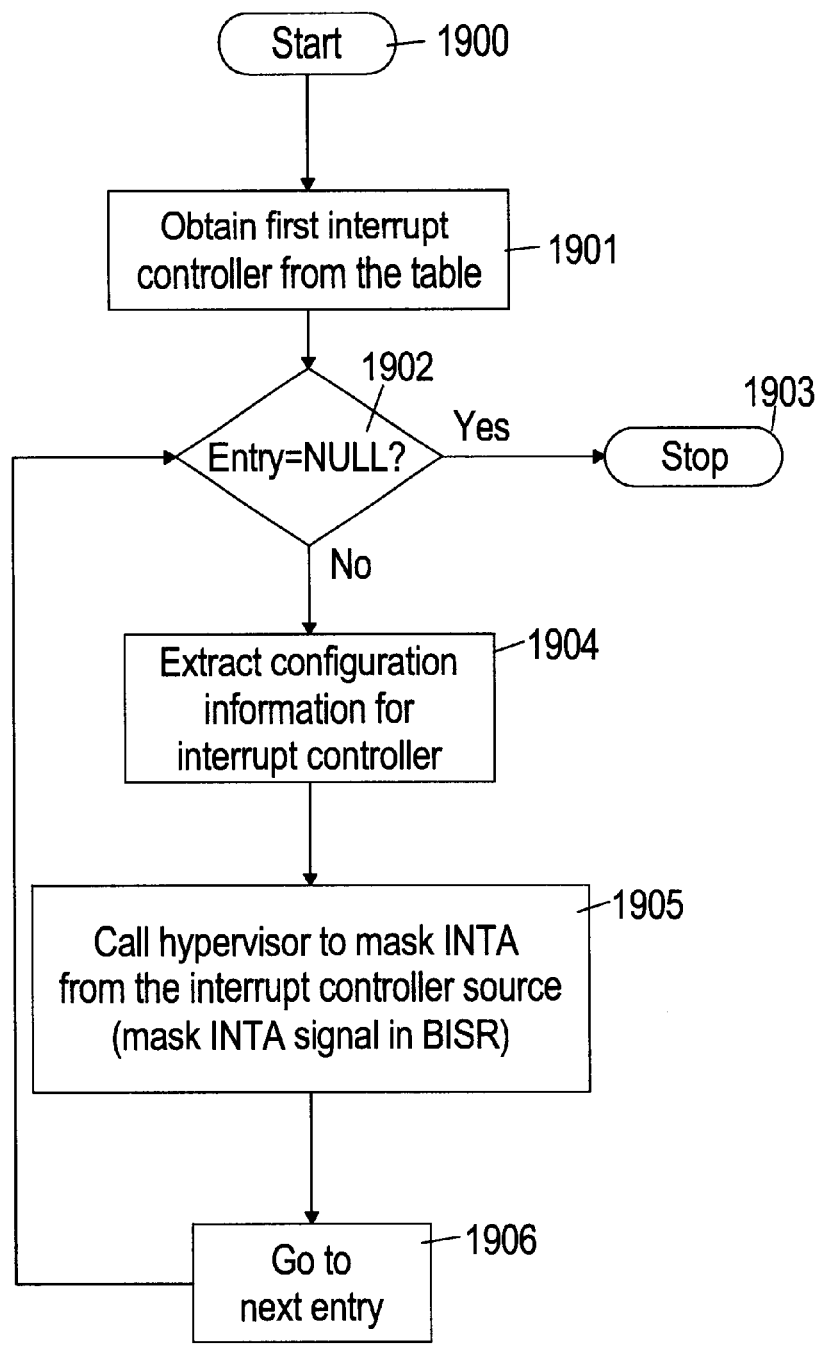
FIG. 19 illustrates an exemplary hardware controller disable routine of an embodiment of the present invention.

FIG. 19 illustrates an exemplary flowchart of a method that begins at step 1900 and at step 1901 obtains a table entry for an interrupt controller associated with an IRQ number. The method continues to step 1902 where the method determines if the table entry obtained is null. If so, the method continues to step 1903 where the routine returns to the caller. If the table entry is not null, an interrupt controller is associated with the IRQ and the method continues to step 1904 where the configuration information for the interrupt controller is obtained. The method continues to step 1905 where the hypervisor is called to, for example, mask the INTA signal in the interrupt controller. Thereafter, the method continues to step 1906 where the next table entry is obtained before returning to step 1902. Therefore, the combination of steps 1902–1906 may operate to mask INTA interrupt signals in each interrupt controller.

Figure 20:
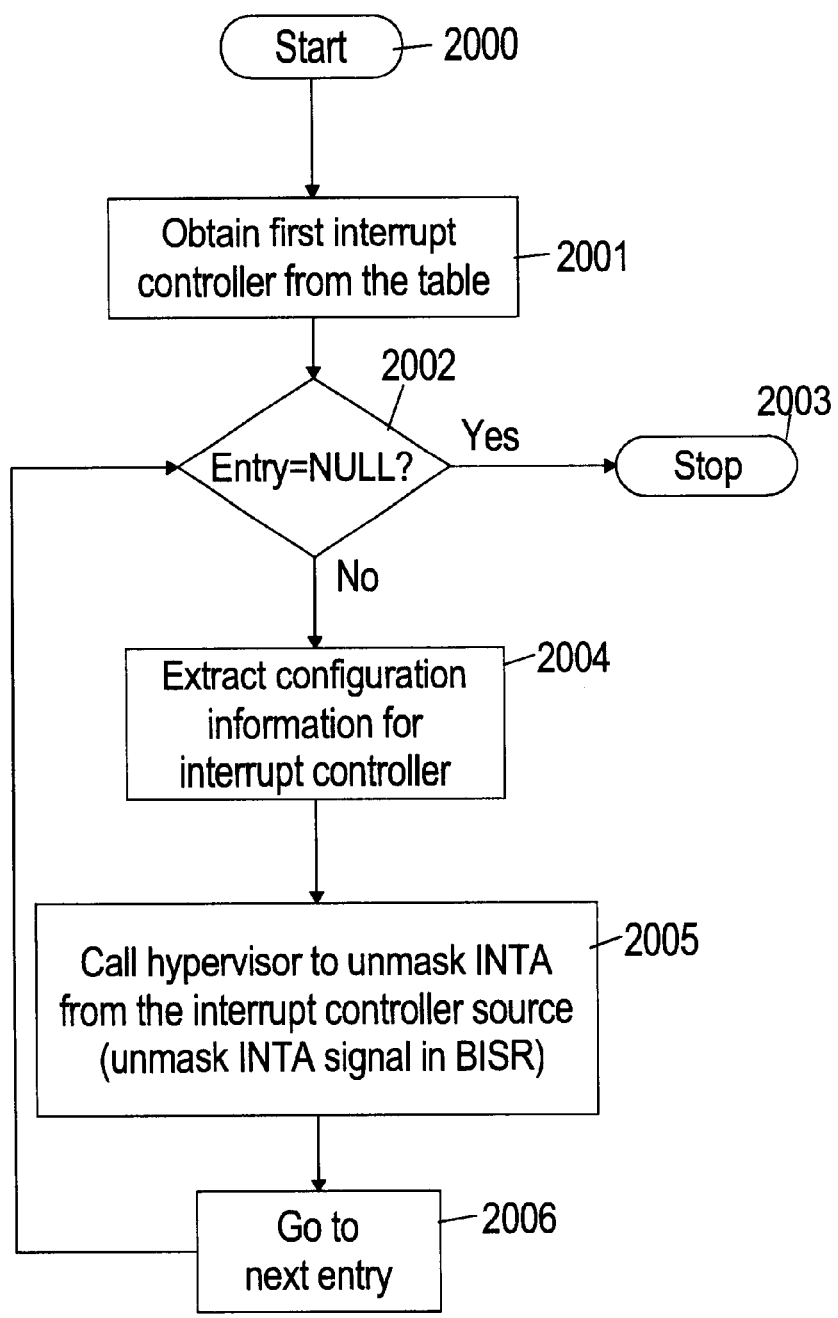
FIG. 20 illustrates an exemplary hardware controller enable routine of an embodiment of the present invention.

FIG. 20 illustrates an exemplary flowchart of a method that begins at step 2000 and at step 2001 obtains a table entry for an interrupt controller associated with an IRQ number. The method continues to step 2002 where the method determines if the table entry obtained is null. If so, the method continues to step 2003 where the routine returns to the caller. If the table entry is not null, an interrupt controller is associated with the IRQ and the method continues to step 2004 where the configuration information for the interrupt controller is obtained. The method continues to step 2005 where the hypervisor is called to, for example, unmask the INTA signal in the interrupt controller. Thereafter, the method continues to step 2006 where the next table entry is obtained before returning to step 2002. Therefore, the combination of steps 2002–2006 may operate to unmask INTA interrupt signals in each interrupt controller.

In a Linux-based system, the architecture-dependent interrupt control programs for PCI buses generally use the IRQ mapping table and call hypervisor programs to perform the appropriate operations on the physical interrupt controllers for the specific IRQs. For example, when the IRQ is disabled or enabled, a controller routine may call hypervisor programs for all physical interrupt sources associated with the IRQ in order to disable or enable the respective hardware interrupts. Once a physical interrupt controller interrupt signal is assigned to an operating system IRQ, the initialization program may call a hypervisor program to communicate to the hypervisor the IRQ number assignment. When the hardware interrupt controller signals a particular interrupt, then the hypervisor may provide the operating system interrupt handling program associated with IRQ number so that the operating system will be able to determine which device driver interrupt handlers to call in response to the specific interrupt.

However, when multiple hardware interrupt sources are assigned to the same operating system IRQ, the number of hardware interrupt controller interrupt sources may exceed the number of IRQs that the operating system may uniquely create. In this situation the initialization program may choose an IRQ that is already assigned to some other hardware interrupt controller interrupt source. Therefore, the IRQ may essentially be shared by more than one hardware interrupt controller. This type of sharing configuration may generate conflicts if one or more of the device drivers for the PCI devices do not allow sharing of an IRQ with another PCI device hardware interrupt source and/or device driver. Therefore, since the initialization program determines IRQ assignments before the PCI bus device driver programs are initialized, it is not necessarily possible for the initialization program to determine which device drivers preclude IRQ sharing during the assignment method. As such, when an IRQ is assigned to an interrupt source that does not allow for IRQ sharing, a system administrator may generally manipulate the IRQ assignments to avoid sharing for devices whose drivers do not permit it. This process may be conducted by physically modifying the placement of the associated PCI device so that another IRQ may be selected.

In similar fashion to the situation where device drivers do not permit sharing of an IRQ, the assignment of more than one device to a specific IRQ may substantially degrade the performance characteristics of one of both of the devices assigned to the common IRQ. Therefore, in this situation, although the respective device drivers may not expressly preclude IRQ sharing, the system administrator may again remove one of the devices from the specific IRQ in order to eliminate the sharing of the IRQ, and thus improve the performance of the devices as a whole.

Therefore, although the present exemplary embodiment may utilize a sharing scheme for IRQs, the present exemplary embodiment may be configured to avoid sharing IRQs until all possible IRQs are assigned to at least one hardware interrupt source. When a sharing situation becomes necessary, the present exemplary embodiment may be configured to distribute the assignment of hardware interrupt sources across IRQs and minimize the number of hardware interrupt sources that share any particular IRQ. Further, although the present exemplary embodiment is configured to distribute shared IRQs, it maintains the capability of physically connecting PCI adapters so as to prevent IRQ sharing by devices that do not incorporate IRQ sharing in their device driver interrupt programs.

In order to distribute IRQs and minimize sharing, the present exemplary embodiment may incorporate a basic round-robin allocation scheme, wherein the initialization program assigns IRQs to each hardware interrupt controller interrupt source in the order these sources are detected. Once the maximum IRQ number is assigned, the IRQ assignments start over again with the lowest IRQ number. This type of process has the advantage that it is simple and insures unique IRQ assignments for each hardware interrupt controller source, provided that the number of IRQs is greater than or equal to the number of hardware interrupt controller interrupt sources. However, a round robin process has the disadvantage that the adding or removing of PCI card slots to/from the partition containing the operating system also modifies the IRQ assignments. Therefore, the IRQ assignment cannot be predicted solely on the basis of physical configuration of the PCI cards that originate the hardware interrupt controller interrupt sources.

Another method for distributing IRQs is to computationally derive an IRQ number from the PCI bus configuration address of the slot, as known to the hypervisor, associated with a hardware interrupt controller interrupt source. For example, the computation may be as follows:

$$(((B-1) \times 16) + (I-1) \times 8 + F) \bmod 254$$

wherein "B" represents the bus number of the PCI bus connecting the device, as known to the hypervisor, "I" represents the PCI bus IOSEL number of the slot relative to that hypervisor PCI bus number, and "F" represents the PCI multifunction device number of the slot relative to that hypervisor PCI bus number. The computation process has the advantage of being relatively simple to implement and allows for the prediction of the IRQ number of any particular slot from system physical configuration information. As such, the system administrator may easily determine IRQ assignments based on physical PCI device card placement. However, the computational process has the disadvantage that IRQ sharing may occur for some IRQs while others have no assigned hardware interrupt sources at all, depending upon the address of the PCI card slots assigned to the particular logical partition. This occurs as a result of the fact that it is wholly possible for a single IRQ to have more than one assignment thereto from the calculation process, while at the same time another IRQ may not have any assignments. Additionally, in an IBM iSeries-type system, for example, the PCI buses typically provide fewer than 16 slots per bus. Therefore, the above noted calculation may result in an irregular distribution of hardware interrupt sources to IRQs, thus clustering a large number of interrupt sources to some IRQs, and very few or none to other IRQs.

Generally, in most PCI bus implementations the number of PCI bus connections to PCI devices, and therefore the number of actual PCI hardware interrupt sources, is relatively small in comparison to the range of values possible for PCI configuration addresses. For example, in an iSeries type system, PCI buses are generally implemented physically within an I/O rack that contains multiple PHBs, each of which are themselves numbered sequentially within that rack. Since the physical packaging generally limits the total number of connections possible for any particular PHB, each PHB has connections for only a few PCI device adapters, on the order of 4 to 8 per PHB and a total of 16 for a complete IO rack. Therefore, in order to associate a physical slot or bus connection on a PCI bus within an IO rack with a configuration address and interrupt controller hardware interrupt source, it generally requires that the hypervisor have some predefined description of these relationships. This may be hard-coded model specific information within the hypervisor implementation, or in iSeries, for example, this information may be provided by vital product data that is readable from the PCI bus hardware by the hypervisor.

In another embodiment of the present invention the computational process for determining IRQ assignments is modified to utilize an integer representation of a PCI card slot location within its physical package in order to derive its IRQ number. The present embodiment may determine the IRQ number through the following formula:

$$[(P-1) \times 16 + (S-1)] \text{modulo } 254$$

wherein "P" represents an integer identifying a PHB from within the complete set of PHBs known to the operating system and "S" represents the index of a slot connected to a particular PHB. The distribution curve of this modified calculation is generally much more uniform than the previous calculation process as a result of the calculation eliminating nonexistent hardware interrupt sources.

The processing of interrupt events by the operating system generally requires notifying each device driver sharing a particular IRQ that an interrupt has occurred. Thereafter, the operating system prevents receiving additional interrupts associated with the specific IRQ associated with the first interrupt until all device drivers have been notified of the interrupt and have conducted their respective initial processing thereof. This eliminates the possibility of a subsequent interrupt for the same IRQ being processed simultaneously with the first interrupt, which can easily lead to unwanted system irregularities and crashes.

In IBM's iSeries configuration, for example, interrupt processing may generally begin when a PCI adapter card activates an interrupt output line on the PCI bus instantiated by the PCI slot that it is connected to. The interrupt output may be received by the PCI-PCI bridge function controlling that PCI slot. Provided that the interrupt has not been previously masked in the bridge function, the multifunction device containing the bridge function may combine this interrupt with interrupt signals from other functions within the device. However, this assumes that there is at least one unmasked interrupt active. The multifunction device may also raise its own interrupt output on the primary PCI bus instantiated by the PHB. If the interrupts from this device are unmasked in the PHB, then the PHB will receive the interrupt output from the device and turn this into a CPU interrupt signal.

The CPU interrupt generally initializes the operation of a branch of the hypervisor external interrupt program. This program may determine the PHB and device that generated the interrupt by reading external interrupt status registers. Once the program has identified the interrupting multifunction device, the program may read an interrupt status from the device in order to determine the interrupting function(s). The hypervisor program may then mask all function/slot interrupts that are active in the hardware, which operates to bock those interrupt signals from being presented to the PHB until they are unmasked. The hypervisor program then builds an interrupt event message for each interrupting slot and schedules this event onto the event queue for the logical partition that owns the slot. Thereafter, the hypervisor program may issue an end-of-interrupt type signal to the PHB, which once again allows the PHB to present interrupts to the CPU. The hypervisor program may then exit from the interrupt handling process.

In addition to the hypervisor accessing the event queue, the operating system in the respective partitions may occasionally poll the partition event queue in search of events to process. In this case, when the partition operating system discovers a pending event, it enters into a simulated interrupt environment. The entry into this environment allows the partition operating system to call event-handling programs to process each event. In the case of a PCI slot interrupt event, the event handler program may extract the IRQ number included by the hypervisor in the event data. The event handler may then call an operating system IRQ router program, which may operate to locate each device driver interrupt handler program registered to the IRQ. Further, the event handler may operate to call each operating system IRQ router program in turn to process any interrupt on the respective devices. Once the device driver programs have completed interrupt processing, the IRQ router program returns to the event handler. The event handler program may then call a hypervisor program to indicate that the interrupt handling for that slot has been completed. In response thereto, the hypervisor program may reset the hardware mask for the slot to allow new interrupts to be presented from that slot. Thereafter, the PCI event handler program exits to allow the next event to be processed, which may be another PCI interrupt or may be some other type of event. Once all pending events have been processed, the operating system may exit from the interrupt environment and continue operation at the point where it was halted by the interrupt.

The method for handling interrupts and masking interrupts that occurs during the processing of a first interrupt generally requires, for example, that series Linux-type partitions interrupt event be enqueued to a single queue representing the operating system external interrupts for a particular logical partition. Further, the Linux-type systems may utilize serial processing of events from the queue. Therefore, although multiple interrupts can occur at physical controllers assigned to the same IRQ, the interrupts may be processed serially. Each interrupt event invokes all device drivers associated with the IRQ, and it may be that the first interrupt event causes all device drivers to reset or clear their associated device interrupt status on all physical interrupt controllers. The remaining events may then appear to be spurious interrupts, and the device drivers may again be invoked and possibly not find interrupt status actually pending in their devices.

Figure 6:
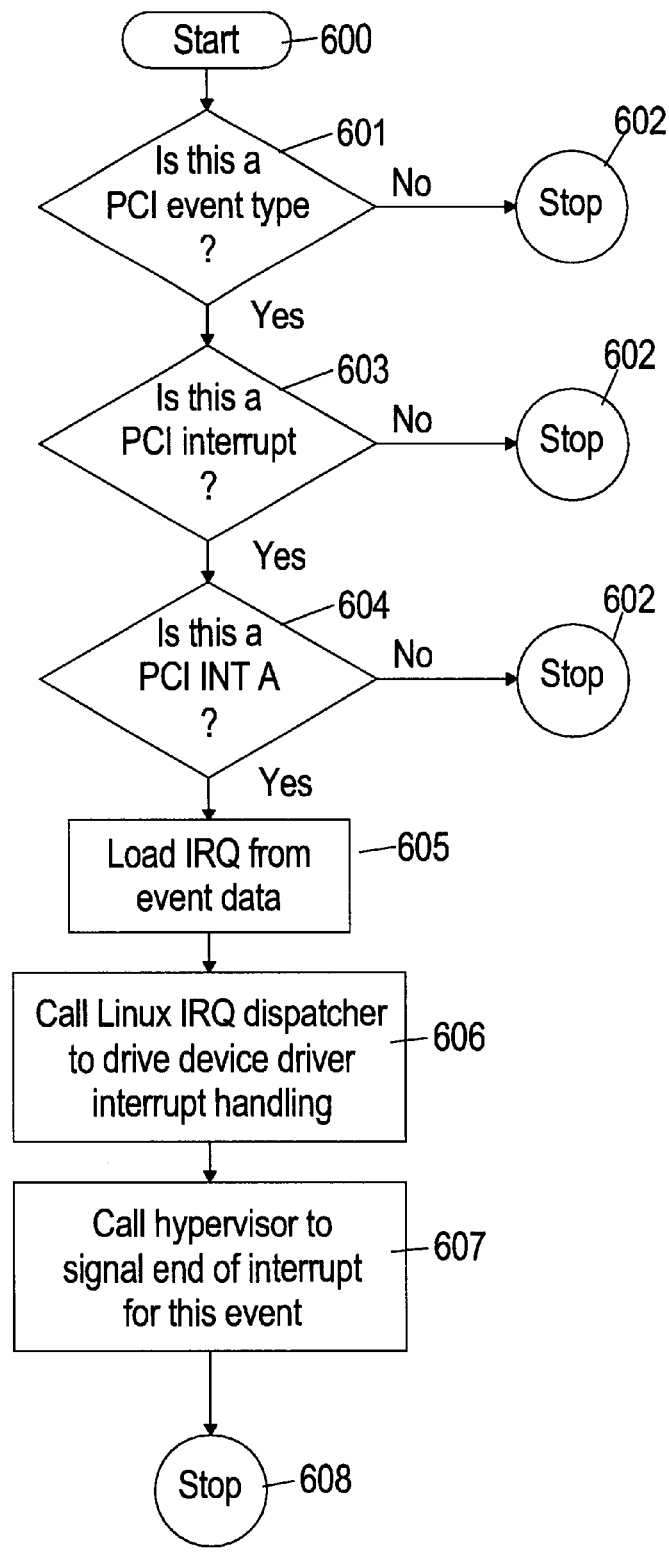
FIG. 6 illustrates a general flowchart of a PCI logical partition event handler for an iSeries Linux.

FIG. 6 illustrates a general flowchart of a PCI logical partition event handler for an iSeries Linux. The method begins with step 600 and continues to step 601 where the method determines if the current event is a PCI event type. If not, then the method exits to step 602, and if so, then the method continues to step 603 where it is determined if the current event is a PCI interrupt. If not, then the method exits to step 602, and if so, then the method continues to step 604 where it is determined if the current event is a PCI INTA. If not, then the method exits to step 602, and if so, then the method continues to step 605. At step 605 the method loads the appropriate IRO number from the event data. At step 606 the method calls the Linux IRQ dispatcher to drive the device driver interrupt handling. At step 607 the method calls the hypervisor to signal the end of the interrupt for the current event. This call allows the method, and in particular the operating system, process additional interrupts, as these have essentially been masked during the processing of the current interrupt. The method ends at step 608.

Figure 7:
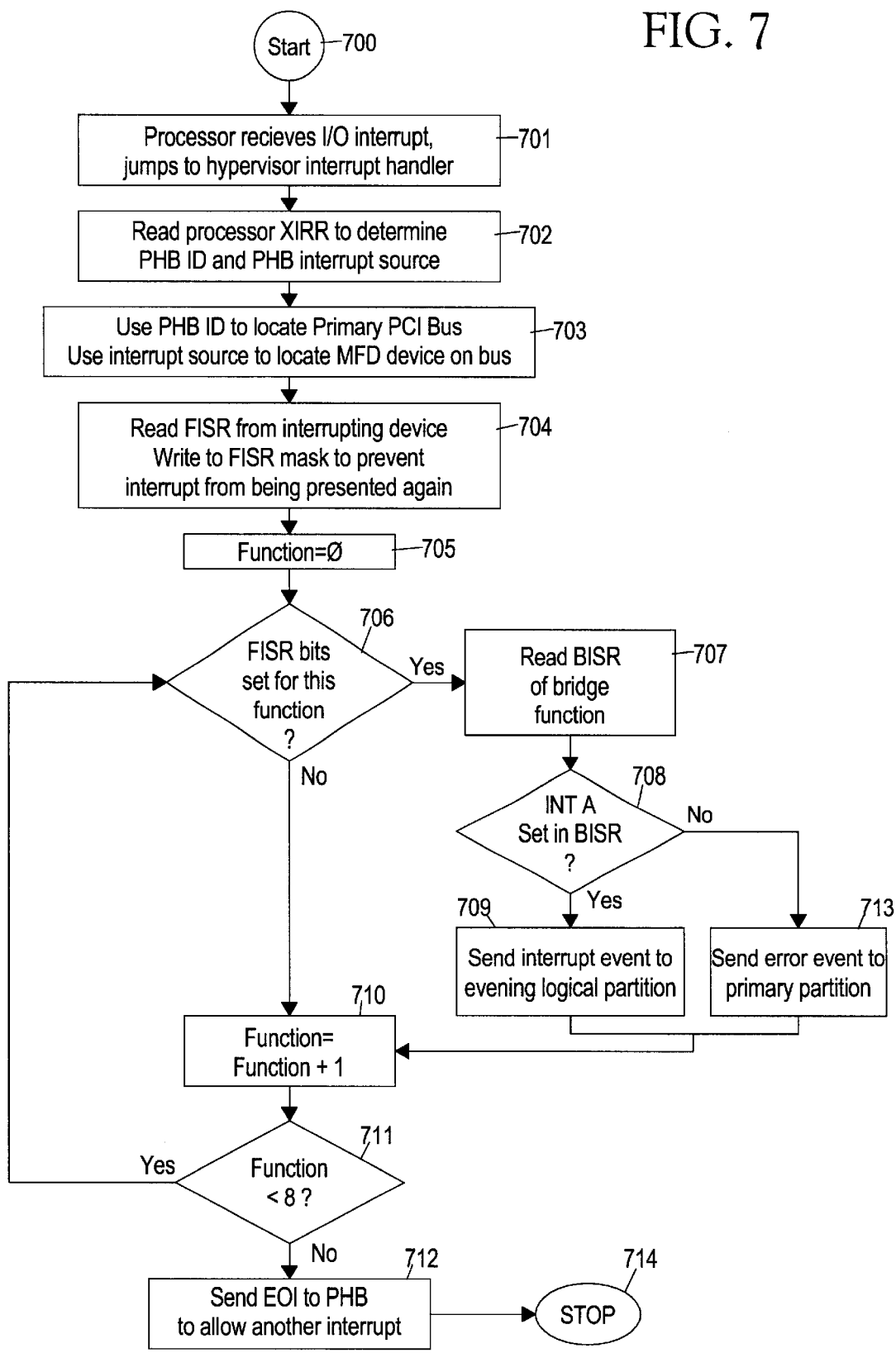
FIG. 7 illustrates an exemplary method for the hypervisor to process PCI interrupts.
Figure 8:
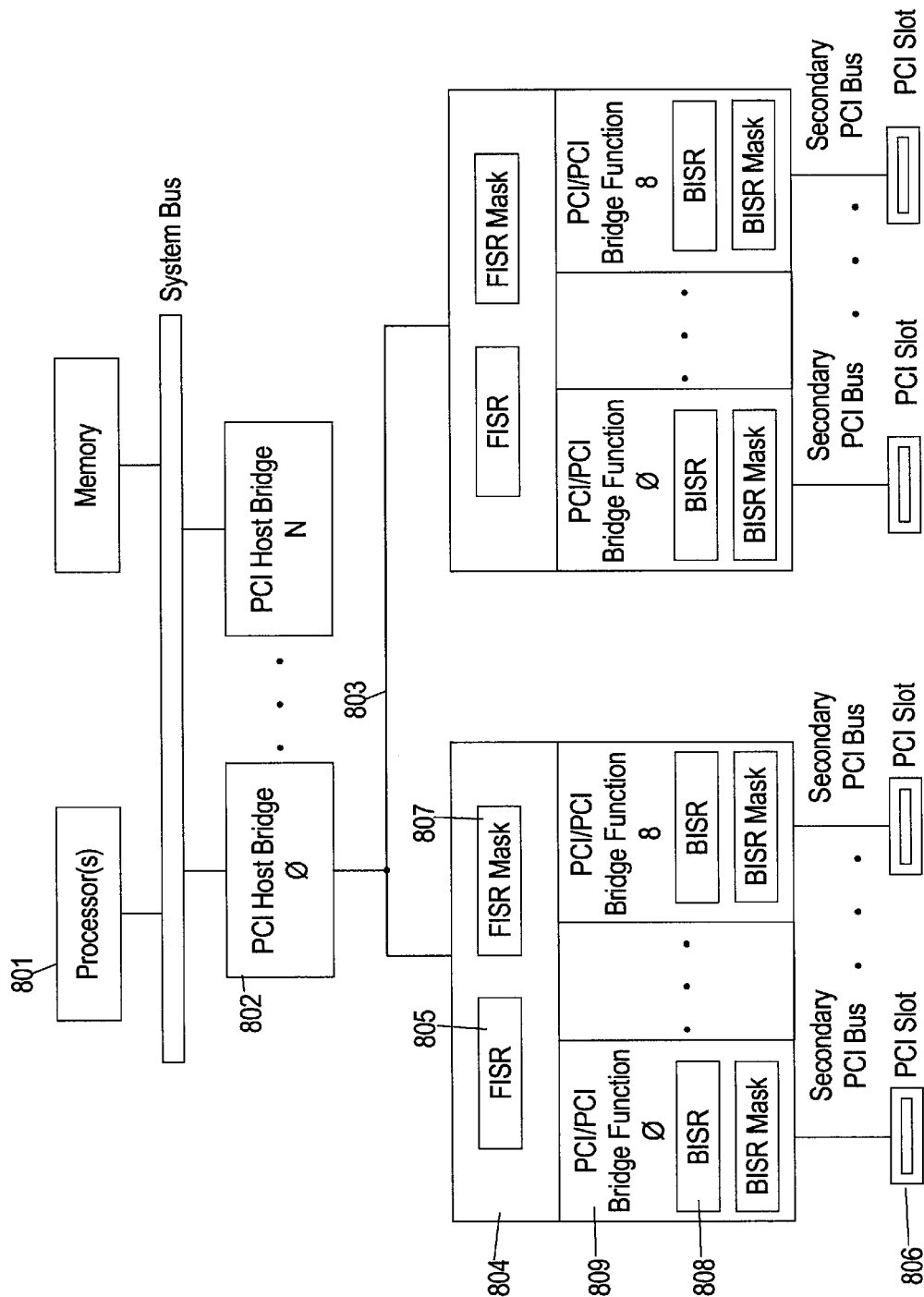
FIG. 8 illustrates an exemplary iSeries PCI hardware configuration of an embodiment of the present invention.

FIG. 7 illustrates an exemplary flowchart for hypervisor interrupt processing for PCI interrupts in an iSeries PCI hardware configuration. FIG. 8 illustrates an exemplary iSeries PCI hardware configuration that may be referenced in the methodology of FIG. 7. The method begins with step 700 and continues to step 701 where the processor 801 receives an IO interrupt from PCI host bridge 802 and jumps to the hypervisor interrupt handler. At step 702 the method reads the processor XIRR to determine the PHB identification parameter and the PHB interrupt source. At step 703 the PHB identification parameter is used to locate the primary PCI bus 803 and the interrupt source is used to determine the MFD device 804 on the bus. At step 704 the method reads the function interrupt summary register (FISR) 805 from the interrupting device, which may be at PCI slot 806, for example. The method also writes to the FISR mask 807 to prevent the interrupt from being presented again at step 704. At step 705 a variable representation, function, for example, is set to 0. At step 706 the method determines of the FISR bits are set for this particular function. If not, then the method continues to step 710 where the variable representation is incremented. If so, then the method continues to step 707 where the BISR 808 of the bridge function 809 is read. At step 708 the method determines if INTA is set in BISR 808. If not, then the method continues to step 713 where an error event is sent to the primary partition. Is so, then an interrupt event is sent to the owning logical partition. After either of steps 709 or 713 the method continues to step 710 where the variable representation is incremented. Thereafter, the method determines if the variable representation is less than 8, which may represent the number of slots 806 on the PCI/PCI function 809. If the variable is less than 8 then the method loops back to step 706, and if the variable is not less than 8, then the method sends an end of interrupt (EOI) signal to the PHB 802 at step 172 so that another interrupt may be allowed to be processed. The hypervisor interrupt processing for PCI interrupts then ends at step 714.

In another embodiment of the present invention, an exemplary method provides a computer operating system running in a logical partition utilizing a small bus numbering algorithm the ability to perform PCI bus configuration IO read/write operations and to build a system IO device tree for use by device drivers on a large scale computer system. For example, the present exemplary embodiment allows for operating system running in a logical partition utilizing a small bus numbering algorithm to perform PCI bus configuration processes and to build an IO tree for an iSeries type system having several hundred and even possibly over 1000 PCI devices and/or slots associated therewith.

Generally speaking, operating systems may be considered to consist of "architecture-dependent" and "architecture-independent" programs. The architecture-dependent programs generally represent programs that recognize unique hardware characteristics of the computer and provide a collection of programs that the architecture-independent programs use to perform hardware operations without having any detailed knowledge of the underlying hardware structure and/or controls.

The present exemplary embodiment utilizes an architecture-dependent PCI bus initialization program of an operating system program within a logical partition to determine the configuration addresses of PCI devices owned by the partition. The configuration addresses, which may generally be the representative PCI bus and device numbers, are different from the configuration addresses of these devices as they are used by the actual hardware and as these are known to the hypervisor of the respective logically partitioned system. Using the exemplary method, architecture independent PCI bus initialization programs in the operating system kernel may operate unchanged in order to produce a programming structure representing the PCI bus configurations assigned to that operating system. This programming structure, often termed a "device tree," generally includes the preferred bus and device numbering scheme for that operating system and its associated PCI device drivers. The exemplary method may be configured to determine the operating system bus numbers such that the bus numbers are unique within the operating system, while those of the actual hardware assignments, which are known to the hypervisor, might otherwise duplicate those of other PCI bus trees or those used by other operating systems in different logical partitions of the same logically partitioned computer.

Therefore, the present exemplary embodiment provides a method by which architecture dependent PCI bus initialization programs of an operating system in a logical partition may detect PCI buses having PCI devices assigned to that partition. Further, the present exemplary method allows the architecture dependent PCI bus initialization programs to determine an operating system bus number for each PCI bus, wherein the determination of the bus number is independent of the actual hardware bus number used to address these devices during PCI configuration read/write operations.

This method is particularly useful when used in conjunction with operating systems such as Linux, Windows, AIX, and other 32-bit operating systems designed for small computers, as these types of systems are generally limited to an 8 bit bus number representing the root PCI buses and secondary PCI buses created by PCI-PCI bridges connected beneath a root PCI bus. This small bus number essentially operates to limit the operating system to at most 256 PCI buses within the overall computer system.

In systems such as the iSeries computer, for example, a very large number of root and secondary PCI buses may exist, any of which may connect PCI devices assigned to a logical partition in which the operating system executes. Therefore, the method of the present exemplary embodiment may be implemented to determine an 8-bit PCI bus number in the architecture-dependent PCI bus initialization programs of an operating system that is not necessarily the same as that used by the hardware or hypervisor to perform configuration IO operations. The exemplary method may further be used to translate between the operating system bus number and the bus number used by the hypervisor or hardware to perform configuration and/or initialization IO operations.

In order to detect the root PCI buses connecting PCI devices assigned to a particular partition, the present exemplary embodiment utilizes the architecture dependent initialization program to iteratively call the hypervisor program. The hypervisor program generally responds with descriptor information for each root PCI bus, or alternatively, indicates that no PCI bus is available to the operating system meeting the specified call parameters. Upon completion of the iterative calling process, the architecture dependent initialization program has incrementally constructed a list of root PCI buses that connect PCI devices assigned to the current operating system, which may be termed the list element programming structure.

However, prior to performing the iterative device detection with regard to any of the root PCI buses, the architecture dependent initialization program creates a table relating the PCI bus numbers, as they are known to the hypervisor, and the list element programming structure created to represent each root PCI bus. Other architecture dependent programs, such as programs to effect a PCI configuration read and/or write operations to a PCI device, may then refer to this table to translate a PCI bus number as it is known by the operating system architecture independent programs, to that known by the hypervisor and used to perform the actual configuration IO operation.

In another exemplary embodiment of the present invention a method by which the architecture dependent PCI bus initialization programs of an operating system in a logical partition detect PCI devices assigned to that partition is provided. The exemplary method may be configured to determine an operating system device number for each such PCI device, independent of the actual hardware device number used to address these devices during PCI configuration read/write operations.

In the present exemplary embodiment, the architecture independent PCI bus initialization programs begin with the first root bus list element, which may be, for example, the above noted list element programming structure, and assigns to that root PCI bus a bus number identifying that bus within the operating system. The architecture independent PCI bus initialization program may then store this bus number in a programming structure that describes this bus throughout the operating system. The architecture independent PCI bus initialization program may then perform an iteration of configuration reads to successive PCI identification select (IDSEL) numbers for that particular operating system bus number. The operating system may begin at IDSEL=1 and attempt to read the configuration vendor identification register for each IDSEL until it reaches a maximum valid IDSEL value. The operating system may call architecture-dependent programs to effect a configuration read or write operation, which may in turn call hypervisor programs that perform the actual configuration read or write using hardware-specific mechanisms.

During this initial architecture-independent device detection loop, the hypervisor may be initialized to prevent the operating system from detecting any PCI devices and return the standard PCI [NoDevsel] status for all IDSELs. In the present exemplary method, upon completion of the initial architecture independent device detection loop, the architecture independent PCI bus initialization program calls an architecture dependent program, which may then perform a hypervisor call to enable detection of the devices under the root PCI buses that are assigned to that logical partition. The architecture dependent PCI bus initialization program may then repeat the device detection loop, incrementing through all possible IDSEL values using the operating system assigned bus number obtained from the bus structure and reading the configuration vendor ID register at each IDSEL. If valid data is returned from a particular IDSEL, i.e., if a device is detected at the IDSEL, then the architecture dependent initialization program may call an architecture independent PCI device initialization program to create a device structure within the operating system that associates that device, and its PCI bus characteristics, with that root PCI bus as it is known to the operating system. The operating system device structure may contain the operating system assigned bus number for the device's primary PCI bus as well as the IDSEL as it is now known to the operating system.

Therefore, the present exemplary method utilizes an IDSEL as it is known by the operating system that may be different from an IDSEL that is known by the hypervisor or used to perform the configuration IO read and/or write operations using hardware mechanisms. Therefore, the architecture dependent program may choose a value of the IDSEL of any device that is most suitable to the operating system for purposes of representing that device to the operating system, and call the hypervisor using a different value of IDSEL, provided that the IDSEL value known to the operating system may be translated to the correct hypervisor value by other architecture dependent programs that effect configuration IO operations. Further, the IDSEL known to the operating system may be either calculated from the value used by the hypervisor, or alternatively, may be recorded in a table associating both values and determined by architecture dependent configuration read or write programs inspecting of this table.

In another exemplary embodiment of the present invention, a method configured to allow the hypervisor hide and/or mask the presence of some PCI-PCI bridges connected to a PCI root bus that are interposed between that bus and the PCI devices used by the partition operating system is provided. Operating systems, such as Linux, for example, may consider that PCI devices they control that are directly connected to a root PCI bus, or that when PCI devices are connected to secondary PCI buses created by a PCI-PCI bridge, that the operating system itself establishes the PCI bus operating characteristics. These operating characteristics may include the PCI bus numbers for those secondary buses. However, I various large scale systems, such as the iSeries, PCI devices may be always connected to the root PCI buses via PCI-PCI bridges. Therefore, it may be preferred to allow the hypervisor to mask from the operating system the presence of certain PCI-PCI bridges interposed between a root PCI bus and those PCI bus devices assigned to the operating system, as this avoids the use of the limited PCI bus numbers known to the operating system for purposes of identifying secondary PCI buses.

The PCI bus architecture generally specifies that IDSEL values may range from 1 to 31 to select devices connected to any PCI bus. However, is not uncommon in PCI hardware implementations to limit the actual number of PCI bus connections and IDSEL values to a much smaller range. Accordingly, the present exemplary method attempts to utilize the IDSEL values outside the range of those implemented within the hardware to represent device IDSELs to the operating system that then encode the actual IDSEL value used by the hypervisor. In order to accomplish this process, the present exemplary method implements a process of encoding the IDSEL value of devices connected under a root PCI bus so as to indicate to the hypervisor that the IDSEL value applies to the secondary PCI bus below a PCI-PCI bridge or to the root PCI bus that connects the PCI-PCI bridge itself. This encoding process is not required to be recognized by the operating system and represents the associated PCI device as it is directly connected to the root PCI bus. In the exemplary embodiment IDSEL values above hexadecimal 10, as they are known to the operating system, may be computationally translated to the actual hypervisor IDSEL value. Architecture dependent configuration read or write programs may perform this translation to derive the correct hypervisor PCI subordinate/secondary bus number and device IDSEL number whenever the operating system specifies a PCI configuration address using IDSEL values ranging from hexadecimal 10 and the PCI specified limit of hexadecimal 1F.

In order for the present exemplary method to computationally transform the operating system IDSEL value to a hypervisor PCI subordinate bus number and IDSEL number, the architecture dependent configuration read and/or write programs may be configured to detect that the high order bit of a 5-bit IDSEL value being "1" signifies that the hypervisor subordinate bus and IDSEL number are encoded therein. For example, using the format "sddddxxx," the "s" may be the high order bit of the IDSEL value known to the operating system and set to the value '1' for devices connected beneath a PCI-PCI bridge connected to the root PCI bus. Further, when "s"='1', then the "dddd" portion may indicate that the root PCI bus configuration address (IDSEL and PCI function number) of the PCI-PCI bridge device that creates the secondary PCI bus that actually connects the PCI device known to the operating system. The "xxx" portion may then represent an identifier that selects one of up to eight PCI devices connected directly to that secondary PCI bus.

In the present exemplary method, there may be only a single PCI IDSEL implemented by the PCI-PCI bridge on its secondary PCI bus and is so implied to the hypervisor. This allows the "xxx" to directly represent the PCI function number of a device within a PCI multifunction device connected to that secondary PCI bus. Additionally, this technique may further extend to include a translation from the "xxx" value, either computationally or tabularly, to a secondary bus IDSEL and function number.

In an exemplary encoding, "dddd" may be further encoded in the format "efff," wherein the "e" represented the IDSEL value, minus 1, of the bridge device and "fff" represented the PCI function number of that bridge at that IDSEL value. This may allow the bridge to be a function within a standardized PCI MFD. In this embodiment, such PCI-PCI bridge devices are generally connected to the root PCI bus at IDSEL 1 or IDSEL 2. Therefore, once the architecture dependent operating system code handling the device IDSEL translation has decoded the operating system device number to a hypervisor device number, then the hypervisor may be informed of the actual address of the device when this information is passed to the hypervisor along with the translated bus number.

In another embodiment of the present invention, the above noted embodiments may be modified to include the ability of the architecture dependent programs to call particular programs in the hypervisor in order to detect the presence of PCI buses and devices and to perform configuration read or write operations.

Generally, when a guest operating system (GOS) goes through the boot process on a machine based on the power PC processor and containing PCI devices that are at the particular partition's control, platform independent code, i.e., the PC BIOS initialization code, is running and/or controlling the process. The general purpose of the platform independent code (PC BIOS initialization code) is to scan each of the PCI buses available to the partition in order to detect the presence of available PCI devices on the respective buses. The GOS may then create a device tree from the information retrieved in the scanning process that generally represents, from a software perspective, the hardware devices found during the PCI bus scan. The generated device tree, which generally contains the software structures representative of the scanned and found devices, may then be stored in memory.

The PCI BIOS initialization code may include a structure of function pointers associated with the code. These pointers may be initialized during the boot process to form platform dependent functions, which in the present exemplary embodiment may be iSeries platform dependent functions, that allow the PCI BIOS initialization code to communicate and cooperatively work with other platforms. The iSeries device detection algorithm may therefore be implemented by initializing the structure of pointers that may point to the iSeries specific function calls.

Figure 9:
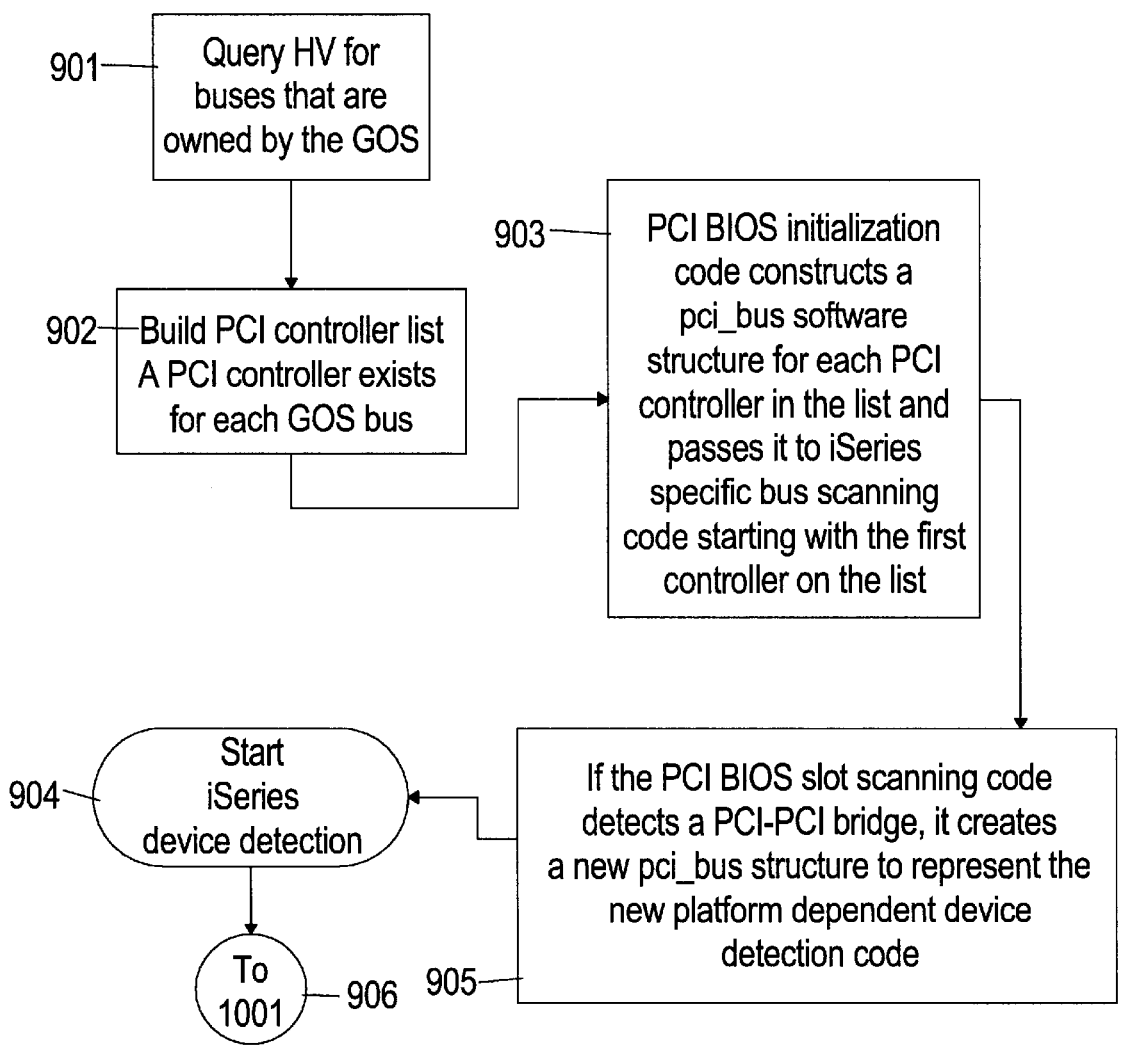
FIG. 9 illustrates an exemplary flowchart of an embodiment of the present invention.

FIG. 9 illustrates an exemplary flowchart of an embodiment of the present invention, wherein the embodiment is based on an IBM iSeries having a logically partitioned configuration. The exemplary method begins at step 901 where the hypervisor is queried for PCI buses that are associated with the GOS. At step 902 the method constructs the PCI controller list for each GOS bus in the configuration. At step 903 the PCI BIOS initialization code constructs the PCI bus software structure for each identified PCI controller in the PCI controller list. The PCI bus software structure is then passed to an iSeries specific bus scanning program code starting with the first controller in the list. At step 905 the method, i.e., the PCI BIOS slot scanning code, creates a PCI bus structure representing the new bus formed by a detected PCI/PCI bridge. Thereafter, the PCI BIOS slot scanning code also calls a platform dependent device detection code. At step 904 the method initiates the iSeries device detection process.

The PCI bus structure passed to the platform dependent code generally includes information indicating the bus number assigned to the PCI bus structure by the GOS. Further the bus structure may also indicate the type of bus represented, i.e., whether the bus if a PCI root bus (a bus attached to the system via a PHB). When the platform dependent device detection code is called at step 905, an entry may be made in the iSeries bus map that corresponds to the bus number seen by the GOS to a hypervisor bus and sub-bus number. The hypervisor bus number may be data that is stored in the PCI root bus and the sub-bus number may be set in the map to a predetermined value, i.e., zero. Alternatively, if the bus is not determined to be a root bus, then the sub-bus member may be read out of the subordinate bus number register in the bridge device forming the non-root PCI bus. The determined sub-bus number may then be added to the bus map.

Figure 10:
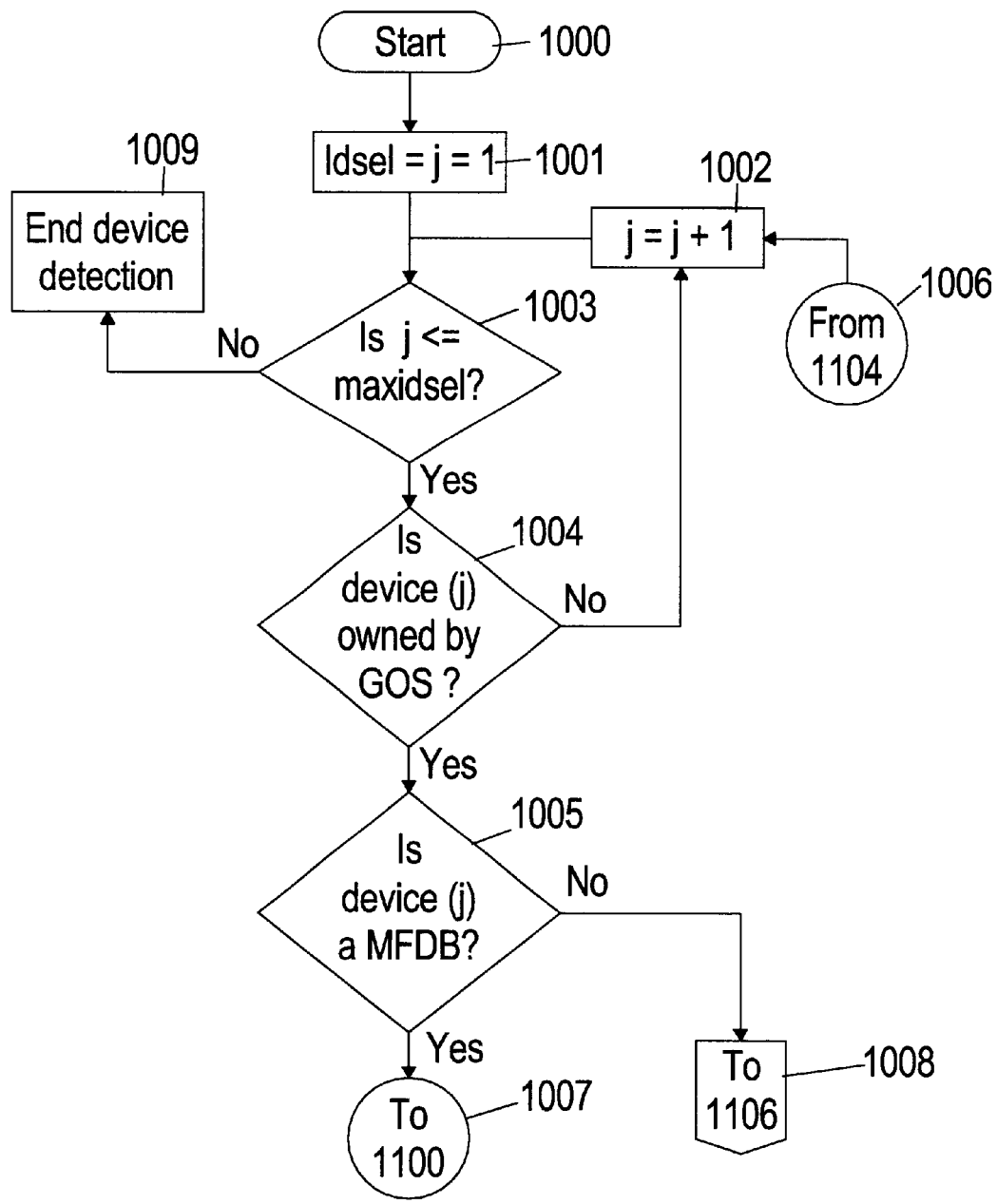
FIG. 10 illustrates a continuation of the flowchart of an embodiment of the present invention illustrated in FIG. 9.

The device detection process continues at step 1000 in the exemplary flowchart illustrated in FIG. 10. At step 1001 the method sets a variable, which is represented as idsel to 1. The idsel variable generally represents a device location on a PCI bus, and the setting of the idsel to 1 essentially operates to initialize the device detection method to the first device location on the PCI bus. Thereafter, the device detection method continues to step 1003 where it is determined if the idsel variable is less than a variable that represents the maximum number of PCI device locations on the particular PCI bus, which is represented in step 1003 as maxidsel. At step 1004 the method determines if the device residing at location idsel is associated with the current GOS. If the device is not associated with the GOS, i.e., if the device is not a device that the GOS has authority to control, then the method continues to step 1002. At step 1002 the idsel parameter is incremented to the next device location on the PCI bus and the method continues to step 1003. Thus, through steps 1002–1004, the method may check each device location on the particular PCI bus for devices associated with the GOS. If the device is determined to be associated with the GOS at step 1004, i.e., if the GOS has authority to control the device at location idsel, then the method continues to step 1005.

At step 1005 the method determines if the device detected at location idsel is a multifunction bridge device. If the device at location idsel id determined not to be a MFD, then the method continues to step 1008. The continuation of the method to step 1008 generally represents the determination that the device is either a simple multifunction device, a single function IO adapter, or a PCI/PCI bridge. In either of these three situations, there is no need to test for slots, as none of these devices include slots, and therefore, the method continues to step 1106 in FIG. 11. Alternatively, if the method in FIG. 10 at step 1005 determines that the device is a MFD, then the method continues to step 1100 in FIG. 11.

Figure 11:
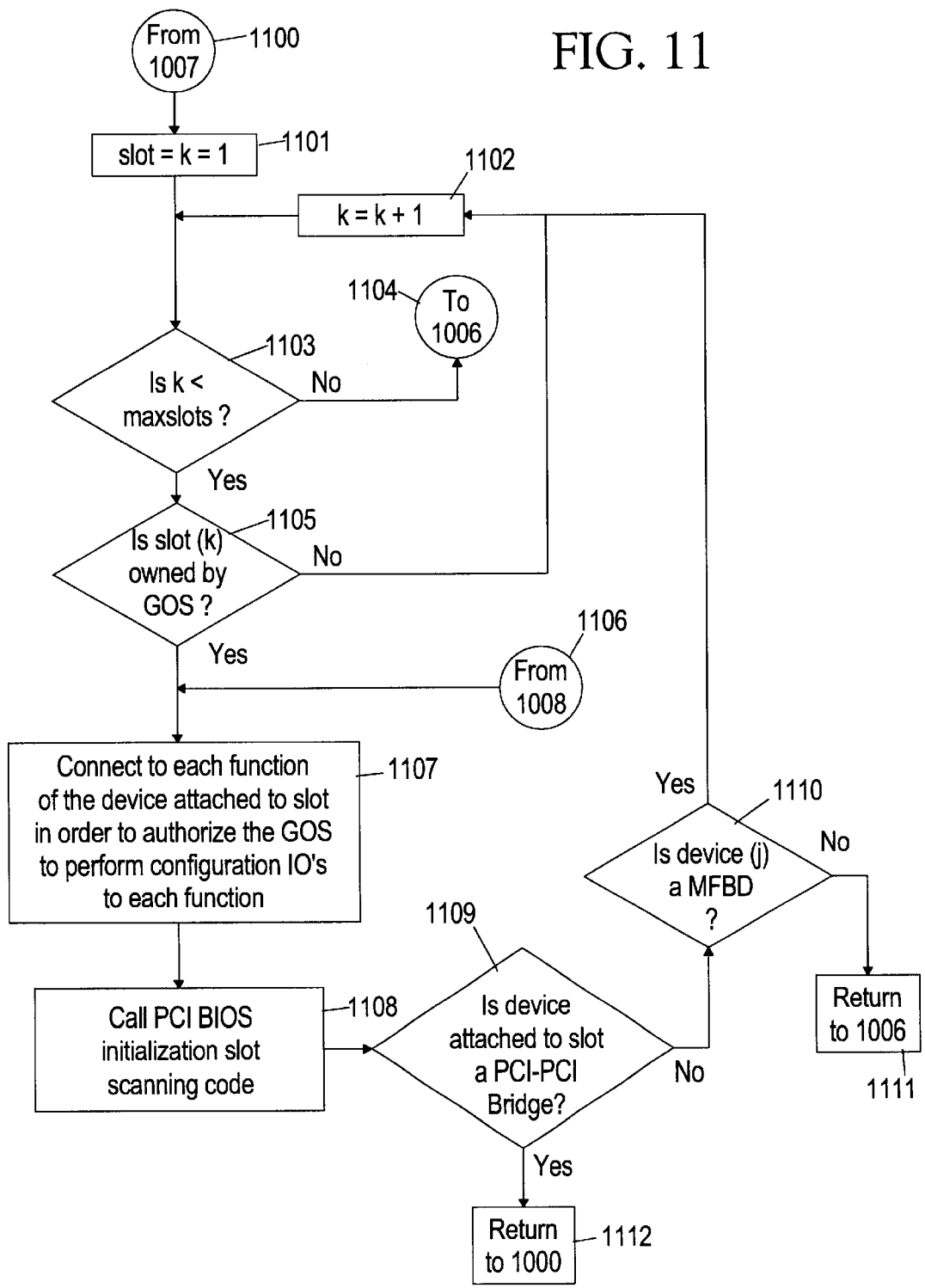
FIG. 11 illustrates a further continuation of the flowchart of an embodiment of the present invention illustrated in FIGS. 9 and 10.

Step 1100 in FIG. 11 generally represents the initial step in a loop process configured to test each slot location on a MFD. Therefore, if a MFD is determined at PCI bus location idsel, then each location on the determined MFD must be tested to determine if the slots thereon are accessible by the current GOS. This process generally begins at step 1101 where the exemplary method sets a slot variable equal to 1, which in similar fashion to the setting of the idsel variable, represents the first slot location on the determined MFD. Thereafter, at step 1103 the method determines if the current slot location is less than the maximum number of slots available on the MFD. The maximum number of slots, which is represented by maxslots, is generally a number that is one greater than the actual number of slots on the MFD. If the current slot location is less than the maximum number of slots, then the method continues to step 1104, which represents a return to the device detection process in FIG. 10 at step 1006. If the current slot location is determined to be less than the maximum number of slots, then the method continues to step 1105 where it is determined if the GOS is authorized to control the current slot. If the GOS is not authorized to control the current slot location, then the method continues to step 1102, where the slot location is incremented by one location and the method continues through the loop of steps 1103 and 1105. If the GOS is determined to be authorized to access the slot location at step 1105, then the method continues to step 1107. At step 1107 the method connects to each function of the device at the slot address in order to authorize the GOS to perform configuration IOs to each function of the slot.

Thereafter, at step 1108 the method calls the PCI BIOS initialization slot scanning code. Thus, once the platform dependent device detection code has detected a device attached to the iSeries MFD, then the platform dependent device detection code is calls off to a platform independent code to scan the device in the slot. The platform independent will generally determine whether the device is a PCI/PCI bridge, a single function IO adapter device, or a MFD and will build the proper software structure for and add it to the GOS device tree. If the device is a PCI/PCI bridge, the GOS will create a PCI bus structure for it a recursively call the platform dependent device detection code. These steps are generally represented in FIG. 9 as steps 901–906, which are represented by the link to step 901 at step 1109 in the present method.

In another embodiment of the present invention, the hypervisor o a logically partitioned computer system is allowed to determine the PCI device configuration of all PCI bus trees in the overall computer system and to choose PCI memory and IO space addresses for the PCI devices in these trees without regard to the number or type of operating systems that execute in the logical partitions of the overall computer system. Further, the hypervisor makes these determinations without regard to which logical partition each device is assigned. Further, the present exemplary embodiment is configured to allow the overall computer system to provide a memory bus having memory addresses of more than that of the PCI buses and devices, for example, a 40 bit memory bus connected to PHBs that create 32-bit PCI buses, and to allow the hypervisor to assign the PCI memory and IO spaces for any PHB to any range of the possible computer memory bus addresses without regard for which logical partition uses the PCI devices associated with those memory bus addresses or the physical address limits of the operating systems.

In yet another embodiment of the present invention, the operating system of a particular logical partition may be configured as an operating system that uses partition memory addresses smaller than the actual computer hardware memory bus address to reference PCI memory and IO spaces correlating to PCI devices assigned to this operating system when the actual PCI bus memory and/or IO address of PCI devices under different PHB root buses are the same. In particular, the present exemplary method allows 32-bit operating systems, such as 32-bit versions of Linux, to operate in a logical partition of a larger computer system having many PCI buses and a memory bus address larger than 32 bits, such that the hypervisor may freely assign PCI memory and IO space addresses that are unique within only a 32 bit PCI address and only within the same PCI bus tree. Further, the present embodiment allows devices in the same PCI tree to belong to different logical partitions where each partition operating system is unaware of the existence of others or the PCI memory and IO addresses assigned to devices that do not belong to that partition operating system.

During the hardware detection phase of a Linux boot process, for example, and specifically during the PCI bus walk process, when a PCI device is detected, conventionally the operating system PCI hardware initialization program(s) call a program to determine system memory addresses that correlate to PCI bus and memory spaces associated with a PCI device. However, with the present exemplary embodiments, this program determines a pseudonym system memory address to correlate to the PCI IO or memory address space for each of the base address registers present in each PCI device assigned to that operating system logical partition, and records this address in a programming structure available to the operating system ad device drivers. In particular, in the Linux operating system this is recorded in the "device structure" that records the characteristics of the device as it is known to the operating system and device driver programs.

The exemplary embodiment utilizes a call to a hypervisor program to determine the size of the memory or IO space for each of the base address registers present in each PCI device assigned to that partition. The exemplary embodiment also creates a table containing the pseudonym address range for the base address registers (BAR) of each device that associates these pseudonym addresses with the operating system device structure, which then further contains the parameters required to reference the actual hardware memory addresses for these spaces through hypervisor program calls.

The present exemplary embodiment further allocates the pseudonym memory addresses such that they appear to the operating system to be the actual system memory address spaces. Further the pseudonym values are determined such that they are unique within the Linux operating system partition and are aligned on an address boundary consistent with that required by the PCI device BAR(s) and that they do not overlap other memory spaces.

Device driver programs executing in the operating system generally retrieve the pseudonym memory addresses from the device structure and use these address as if they were actual hardware memory addresses to perform the PCI read and write IO operations. When the device driver performs a memory read or write operation, it may call an operating system program which in turn is implemented to translated the pseudonym address to a PCI configuration address identifying the device and BAR descriptor identifying the particular BAR within that device. These are in turn passed as arguments to a hypervisor program that performs the actual PCI memory read or write operation. The pseudonym translation table may contain the association between a pseudonym memory address and the system address of the device structure containing the PCI device and BAR descriptors. The implementation of the operating system PCI memory read/write program therefore may use the pseudonym address as a key to lookup the device and BAR descriptors in the table and then call the hypervisor program with these parameters to effect the PCI read or write operation with the actual hardware addresses correlating to the pseudonym address. Using these descriptors, the hypervisor device may identify the device and validate that the Linux partition has authority to use the device and then performs the PCI read/write operation to the hardware memory address space for the device.

Therefore, embodiments of the present invention allow the PCI bus initialization programs and device drivers of an operating system in a logical partition to determine the number and type (memory or IO space) of PCI base address registers provided in an IO device adapter, without altering any values previously assigned to these registers by a hypervisor. Further, embodiments of the present invention allow for the PCI bus initialization programs and device drivers of an operating system in a logical partition to determine a partition address range, which is generally known to only that logical partition operating system, for each base address register and each PCI IO device adapter. Embodiments of the present invention may choose a system memory address for PCI bus IO and memory spaces that is consistent and compatible with the operating system determined memory ranges for main storage and other operating system memory addresses. Further, embodiments of the present invention allow the PCI bus initialization programs and device drivers of an operating system in a logical partition to reference the associated PCI IO device adapter memory and/or IO addresses in a manner that allows the hypervisor to distinguish and authenticate that reference as authorized to access the programs in that logical partition. Further, the hypervisor may translate the partition address for that PCI memory and/or IO facility to the actual computer memory bus and PCI memory and/or IO address for that facility.

Figure 12:
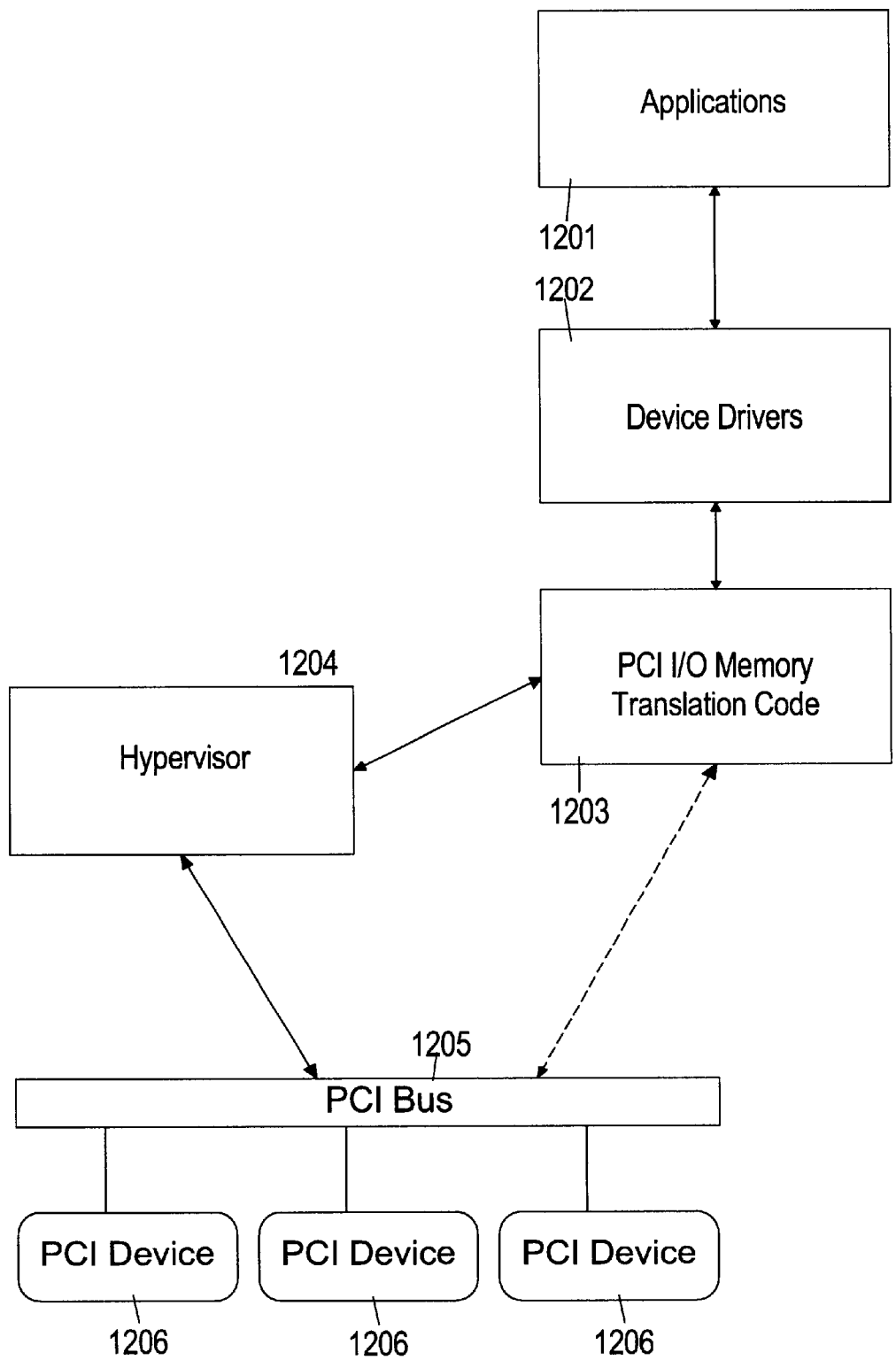
FIG. 12 illustrates an exemplary hardware configuration for an iSeries Linux system.

FIG. 12 illustrates an exemplary hardware configuration for implementing selected embodiments of the present invention. More particularly, FIG. 12 illustrates a configuration of an iSeries system operating in a Linux environment. In this configuration, the various program applications 1201 are in communication with the device drivers 1202. The device drivers are in communication with the system PCI IO memory translation code 1203. The memory translation code 1203 is generally in communication with the PCI bus 1205. However, memory translation code 1203 may be in pseudo communication with PCI bus 1205, which indicates that to the device drivers 1202 it appears that there is a true connection to the PCI devices through the PCI bus 1205 absent communication through the hypervisor 1204. The hypervisor 1204 is also in communication with the system PCI bus 1205, which communicates with the various system PCI devices 1206. Thus, in the exemplary iSeries partitioned environment, the device drivers 1202 will generally use read and/or write macros to read and/or write data to the PCI devices 1206. These macros may call the iSeries PCI IO memory translation code 1203 for translation of the PCI IO addresses to the physical device. Further, the macros may call the hypervisor 1204 to conduct any read and/or write PCI IO memory operations. Therefore, this configuration allows the PCI devices 1206 to appear to the device drivers 1202 as if they are real devices and do not require any changes in the supporting code. This configuration is distinct from traditional devices, as the device drivers in traditional systems generally use read and write macros to read/write data to the PCI devices. Therefore, these macros may generate CPU bus instructions to read and/or write the data to the PCI IO memory for the device.

Figure 13:
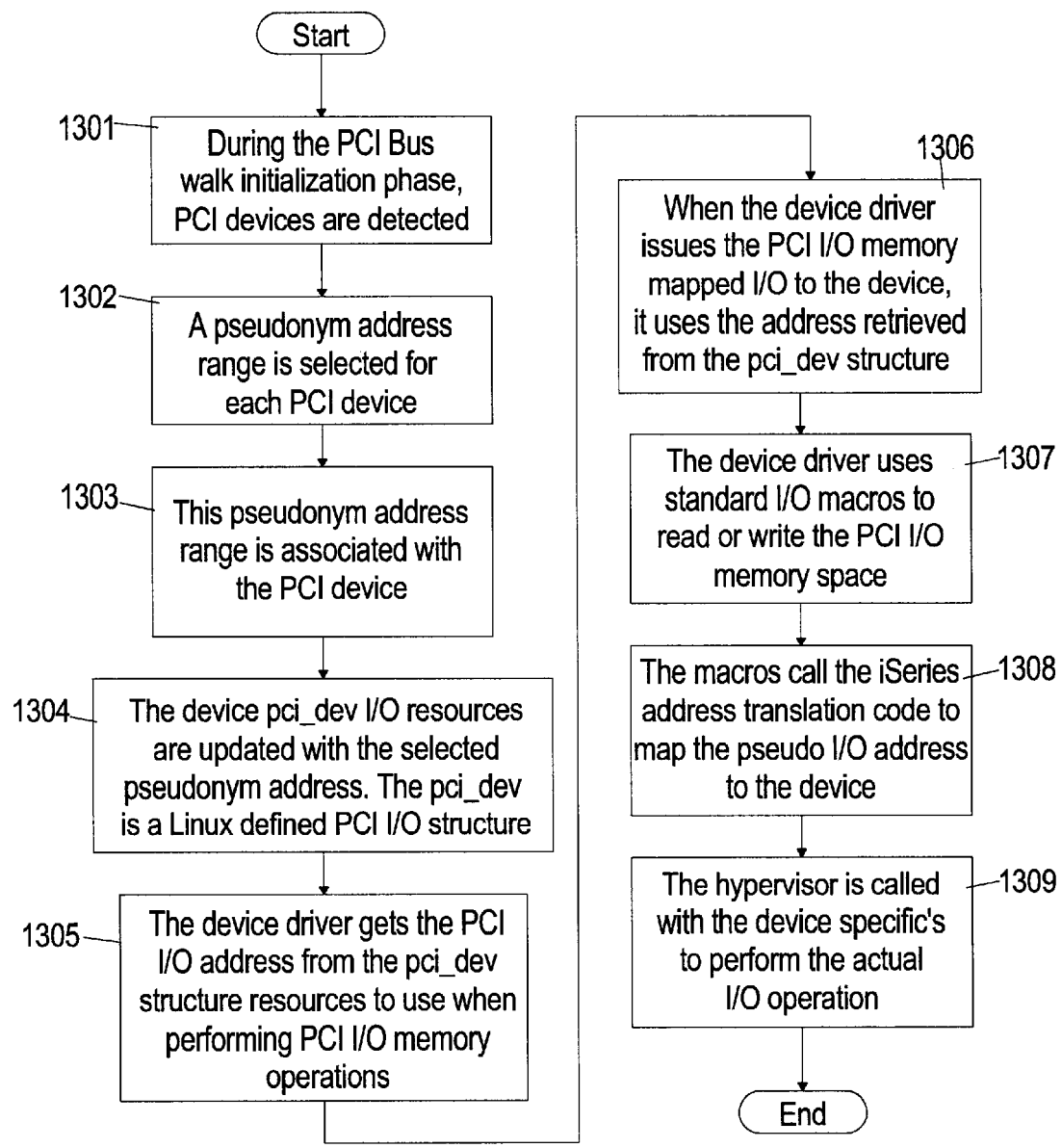
FIG. 13 illustrates an exemplary flow diagram of a general initialization and execution process of an embodiment of the present invention.

FIG. 13 illustrates a high-level flow diagram of the initialization and execution process of an exemplary embodiment of the present invention configured to conduct PCI IO memory mapping in a logically partitioned system. The initialization process, which is represented by steps 1301 through 1305, begins with step 1301, where the PCI devices are detected in a bus walk-type operation. At step 1302 a pseudonym address range may be selected for each PCI device detected in the bus walk operation. At step 1303 the selected address range may be associated with each individual PCI device. At step 1304 the device resources may be updated with the selected pseudonym address. Thereafter, the device driver may obtain the PCI IO address from the device resources, and this address may be used when performing PCI IO memory operations.

Steps 1306 through 1309 generally represent the execution process of the exemplary embodiment of the present invention configured to conduct PCI IO memory mapping in a logically partitioned system. Step 1306 begins the execution process by allowing a device driver to use the address retrieved from the device resources when the device driver issues and PCI IO memory mapped IO to the device. Step 1307 continues the execution process, as the device driver uses standard IO macros to read and/or write the PCI IO memory space at this step. Thereafter, the method continues to step 1308 where the macros call the iSeries address translation code to map the pseudo IO address to the device. At step 1309 the execution portion of the method is generally completed when the hypervisor is called to perform the actual IO operation with the device specific information.

Figure 14:
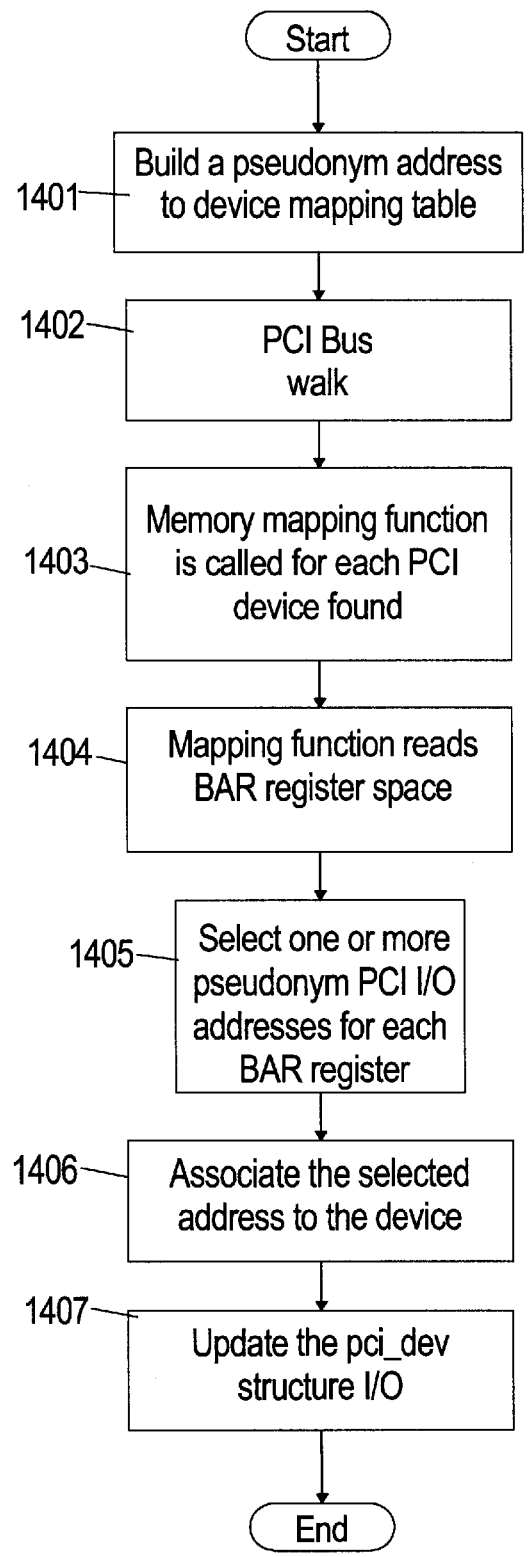
FIG. 14 illustrates a detailed exemplary flow diagram of an initialization process of an embodiment of the present invention.

FIG. 14 illustrates a more detailed flowchart of the initialization process generally illustrated in the embodiment presented in FIG. 13. The method illustrated in the flowchart of FIG. 14 begins with step 1401, where the PCI IO memory mapping initialization builds a pseudonym "address to device" mapping table. The size of the address to device table may be determined by the addressable address range and the granularity of each entry. Further, the complete address range may be used, and the addresses do not actually exist and are generally only accessed through the use of macros. At step 1402 the PCI bus walk is conducted, and thereafter, at step 1403 the PCI IO memory mapping function is called for each PCI device found in the bus walk. At step 1404 the mapping function reads the Bar register space that is generally required from the device pci_dev (device) resources. Thereafter, at step 1405 the mapping function selects one or more pseudonym PCI IO addresses for each BAR register. At step 1406 the memory mapping function associated the selected address with the device by using the address as an index and adding the device structure pointer and BAR to the mapping table. At step 1407 the mapping function updates the device structure IO resources with the pseudonym address to be used as if it was a real PCI IO memory address, which generally completes the initialization process.

Figure 15:
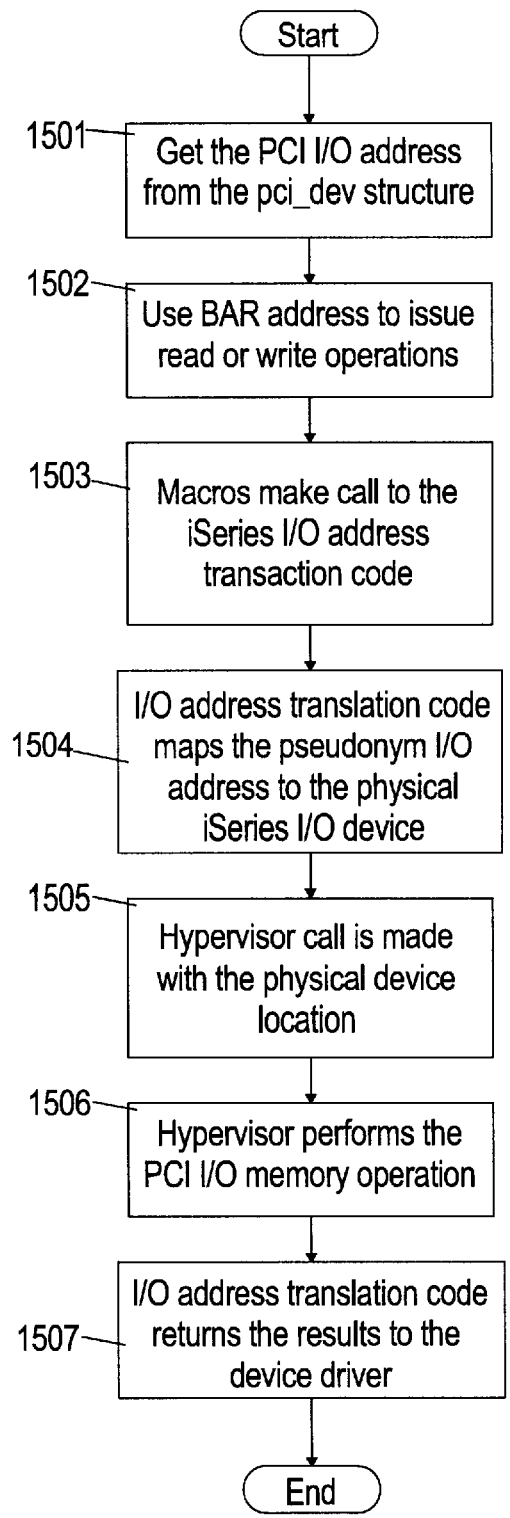
FIG. 15 illustrates a detailed exemplary flow diagram of an execution process of an embodiment of the present invention.

A detailed flow diagram of the execution process is shown in FIG. 15. The detailed diagram of the execution process begins with step 1501 where the device driver gets the PCI IO address from the device structure. In the present exemplary embodiment the PCI IO address will generally be the pseudonym address that was selected for the particular space. At step 1502 the device driver uses this BAR address to issue read and/or write operations through the use of, for example, "readb," "readw," "readl," "writeb," "writew," and/or "writel" macros. At step 1503 these macros may call to the iSeries IO address translation code passing the address and data thereto. At step 1504 the iSeries IO address translation code may map the pseudonym IO address to the physical iSeries IO device attached to the hypervisor. At step 1505 the hypervisor may call with the physical device location (bus, sub bus, slot) Bar register, address offset within space, and the data passed, for example. Thereafter, at step 1506 the hypervisor may perform the PCI IO memory operation and in the case of a read operation, return the results. At step 1507 the iSeries IO address translation code may return the results to the device driver.

While the foregoing is directed to various embodiments of the present invention, other and further embodiments of the invention may be devised without departing from the basic scope thereof, wherein the scope thereof is determined by the following claims.

We claim:

1. A method for detecting peripheral component interconnect (PCI) buses in a logically partitioned system, comprising:

determining PCI buses that are accessible to a guest operating system via querying a hypervisor;

generating a PCI controller list, wherein a PCI controller exists for each determined PCI bus;

constructing a PCI bus structure for each PCI controller in the PCI controller list;

calling a platform dependent device detection code to detect PCI devices accessible to the logically partitioned system; and connecting to each function of each detected PCI device to authorize the guest operating system to conduct configuration IO operations thereon through a platform dependent code operation.

2. The method of claim 1, further comprising:

calling a slot scanning code to detect PCI slots accessible to the guest operating system with an architecture independent code program;

generating a PCI/PCI bus structure for each PCI slot detected with an architecture independent code program; and calling the platform dependent device detection code to detect PCI devices in communication with the PCI slots that are accessible to the guest operating system.

3. The method of claim 1, further comprising generating a PCI bus structure representative or the PCI buses determined to be accessible to the guest operating system with an architecture independent code program.

4. The method of claim 3, wherein calling a platform dependent device detection code to detect PCI devices accessible to the logically partitioned system further comprises:

passing the PCI bus structure to the platform with an architecture independent code program;

inserting an entry into a bus map correlating a bus number viewed by the guest operating system to a hypervisor bus and subbus number with a platform dependent code action; and storing the hypervisor bus and subbus number in a PCI controller structure with a platform dependent code action.

5. The method of claim 1, calling a platform dependent device detection code to detect PCI devices accessible to the logically partitioned system further comprises executing a bus walk process operation via an architecture dependent code action.

6. The method of claim 5, wherein the bus walk process operation further comprises:

reading each possible device location that is accessible to the guest operating system;

determining if a device located at each possible device location is multifunction bridge device; and determining if each possible slot in a device determined to be a multifunction bridge device is accessible to the guest operating system.

7. The method of claim 1, further comprising calling an architecture independent PCI BIOS initialization slot scanning code, wherein the slot scanning code is configured to build a representative software structure for a determined device and add the representative software structure to a guest operating system device tree.

8. A method for detecting peripheral component interconnect (PCI) buses and devices in a logically partitioned system, comprising:

determining PCI buses owned by a guest operating system of the logically partitioned system with an architecture dependent code program;

building a PCI controller list representative of each PCI controller corresponding to each PCI bus determined to be owned by the guest operating system with an architecture dependent code action;

constructing a PCI bus device software structure for each PCI controller in the controller list with an architecture dependent code program;

passing the PCI BUS device software structure to a bus scanning code with an architecture dependent code program;

executing a PCI device detection process with an architecture dependent code program;

authorizing the guest operating system to perform configuration IOs with each function of each device detected with an architecture dependent code program; and executing an architecture independent PCI BIOS initialization slot scanning code.

9. The method of claim 8, wherein determining PCI buses owned by a guest operating system further comprises executing at least one hypervisor query.

10. The method of claim 8, wherein constructing a PCI bus device software structure further comprises calling a PCI BIOS initialization code.

11. The method of claim 8, wherein executing a PCI device detection process further comprises:

passing the PCI BUS device software structure to a platform dependent device detection code;

generating an entry in a bus map associating a quest operating system (GOS)-type bus number with a hypervisor bus and subbus number; and storing the hypervisor bus and subbus number in the PCI controller list.

12. The method of claim 8, wherein executing a PCI device detection process further comprises:

setting an ID select parameter to an initial value;

determining if the ID select parameter is less than a predetermined maximum number of device location;

determining if a device at the location designated by each ID select parameter is accessible by the guest operating system;

determining if a device at the location designated by each ID select parameter is a multi-function device; and determining if each slot of a multi-function device is accessible to the guest operating system, if a device is determined to be the multi-function device.

13. The method of claim 8, wherein executing a PCI BIOS initialization slot scanning ode further comprises:
scanning each detected slot with a platform independent code;
determining if a device in communication with each slot is at least one of a PCI/PCI bridge, a single function IO adapter, and a multi-function device;
building a representative software structure corresponding to the device determined; and
adding the representative software structure to a guest operating system device tree.

14. A computer readable medium storing a software program that, when executed by a processor, causes the processor to perform a method for detecting peripheral component interconnect (PCI) buses in a logically partitioned system, comprising:
determining PCI buses that are accessible to a guest operating system via querying a hypervisor;
generating a PCI controller list, wherein a PCI controller exists for each determined PCI bus;
constructing a PCI bus structure for each PCI controller in the PCI controller list;
calling a platform dependent device detection code to detect PCI devices accessible to the logically partitioned system; and
connecting to each function of each detected PCI device to authorize the guest operating system to conduct configuration IO operations thereon through a platform dependent code operation.

15. The computer readable medium of claim 14, further comprising:
calling a slot scanning code to detect PCI slots accessible to the guest operating system with an architecture independent code program;
generating a PCI/PCI bus structure for each PCI slot detected with an architecture independent code program; and
calling the platform dependent device detection code to detect PCI devices in communication with the PCI slots that are accessible to the guest operating system.

16. The computer readable medium of claim 14, further comprising generating a PCI bus structure representative of the PCI buses determined to be accessible to the guest operating system with an architecture independent code program.

17. The computer readable medium of claim 16, wherein calling a platform dependent device detection code to detect PCI devices accessible to the logically partitioned system further comprises:
passing the PCI bus structure to the platform with an architecture independent code program;
inserting an entry into a bus map correlating a bus number viewed by the guest operating system to a hypervisor bus and subbus number with a platform dependent code action; and
storing the hypervisor bus and subbus number in a PCI controller structure with a platform dependent code action.

18. The computer readable medium of claim 14, wherein calling a platform dependent device detection code to detect PCI devices accessible to the logically partitioned system further comprises executing a bus walk process operation.

19. The computer readable medium of claim 18, wherein the bus walk process operation further comprises:
reading each possible device location that is accessible to the guest operating system;
determining if a device located at each possible device location is multifunction bridge device; and
determining if each possible slot in a device determined to be a multifunction bridge device is accessible to the guest operating system.

20. The computer readable medium of claim 14, further comprising calling an architecture independent PCI BIOS initialization slot scanning code, wherein the slot scanning code is configured to build a representative software structure for a determined device and add the representative software structure to a guest operating system device tree.

21. A computer readable medium storing a software program that, when executed by a processor, causes the processor to perform a method for detecting peripheral component interconnect (PCI) buses and devices in a logically partitioned system, comprising:
determining PCI buses owned by a guest operating system of the logically partitioned system with an architecture dependent code program;
building a PCI controller list representative of each PCI controller corresponding to each PCI bus determined to be owned by the guest operating system with an architecture dependent code action;
constructing a PCI bus device software structure for each PCI controller in the controller list with an architecture dependent code program;
passing the PCI BUS device software structure to a bus scanning code with an architecture dependent code program;
executing a PCI device detection process with an architecture dependent code program;
authorizing the guest operating system to perform configuration IOs with each function of each device detected with an architecture dependent code program; and
executing an architecture independent PCI BIOS initialization slot scanning code.

22. The computer readable medium of claim 21, wherein determining PCI buses owned by a guest operating system further comprises executing at least one hypervisor query.

23. The computer readable medium of claim 21, wherein constructing a PCI bus device software structure further comprises calling a PCI BIOS initialization code.

24. The computer readable medium of claim 21, wherein executing a PCI device detection process further comprises:
passing the PCI BUS device software structure to a platform dependent device detection code;
generating an entry in a bus map associating a guest operation system GOS-type bus number with a hypervisor bus and subbus number; and
storing the hypervisor bus and subbus number in the PCI controller list.

25. The computer readable medium of claim 21, wherein executing a PCI device detection process further comprises:
setting an ID select parameter to an initial value;
determining if the ID select parameter is less than a predetermined maximum number of device locations;
determining if a device at the location designated by each ID select parameter is accessible by the guest operating system;

determining if a device at the location designated by each ID select parameter is a multi-function device; and determining if each slot of a multi-function device is accessible to the guest operating system, if a device is determined to be a multi-function device.

26. The computer readable medium of claim 21, wherein executing a PCI BIOS initialization slot scanning code further comprises:

scanning each detected slot with a platform independent code;

determining if a device in communication with each slot is at least one of a PCI/PCI bridge, a single function IO adapter, and a multi-function device;

building a representative software structure corresponding to the device determined; and adding the representative software structure to a guest operating system device tree.

* * * * *

UNITED STATES PATENT AND TRADEMARK OFFICE
CERTIFICATE OF CORRECTION

PATENT NO. : 6,820,164 B2
DATED : November 16, 2004
INVENTOR(S) : Wayne Gustav Holm et al.

It is certified that error appears in the above-identified patent and that said Letters Patent is hereby corrected as shown below:

Title page,
Item [54], Title, should read as follows -- PERIPHERAL COMPONENT INTERCONNECT BUS DETECTION IN LOGICALLY PARTITIONED COMPUTER SYSTEM, INVOLVES AUTHORIZING GUEST OPERATING SYSTEM TO CONDUCT CONFIGURATION INPUT-OUTPUT OPERATIONS WITH EACH FUNCTION OF PCI DEVICES --
Item [74], *Attorney, Agent, or Firm*, "Sheridah" should be -- Sheridan --.

Column 31,
Line 45, "or" should read -- of --.
Line 61, before "calling" insert -- wherein --.

Column 32,
Line 59, "location" should read -- locations --.

Column 33,
Line 5, "ode" should read -- code --.

Signed and Sealed this

Twenty-sixth Day of April, 2005

JON W. DUDAS
*Director of the United States Patent and Trademark Office*